United States Patent [19]

Futsuhara et al.

[11] Patent Number: 5,773,972
[45] Date of Patent: Jun. 30, 1998

[54] TRANSITION DETECTION CIRCUIT FOR DETECTING TRANSITIONS IN THE STATE OF AN OBJECT OF DETECTION

[75] Inventors: Koichi Futsuhara; Toshihito Shirai, both of Saitama-ken, Japan

[73] Assignee: The Nippon Signal Co., Ltd., Tokyo, Japan

[21] Appl. No.: 750,144

[22] PCT Filed: Mar. 8, 1996

[86] PCT No.: PCT/JP96/00585

§ 371 Date: Dec. 6, 1996

§ 102(e) Date: Dec. 6, 1996

[87] PCT Pub. No.: WO96/31755

PCT Pub. Date: Oct. 10, 1996

[30] Foreign Application Priority Data

Apr. 6, 1995 [JP] Japan ..................... PCT/JP95/00675

[51] Int. Cl.$^6$ ............................. G01P 13/00; G01P 3/00; G01R 31/00; G08B 19/00
[52] U.S. Cl. ................ 324/161; 324/166; 324/537; 324/772; 318/799; 340/648; 340/671; 361/242
[58] Field of Search ............................. 324/160, 161, 324/163, 165, 166, 173, 174, 175, 772, 537; 318/490, 798, 799; 340/648, 670, 671, 679; 361/23, 28, 236, 239, 240–242

[56] References Cited

U.S. PATENT DOCUMENTS

| | | | |
|---|---|---|---|
| 3,932,812 | 1/1976 | Milligan | 324/61 |
| 4,013,945 | 3/1977 | Groso | 324/173 X |
| 4,763,054 | 8/1988 | Bundy | 324/165 X |
| 5,451,867 | 9/1995 | Loreck et al. | 324/166 |

*Primary Examiner*—Gerard R. Strecker
*Attorney, Agent, or Firm*—Oblon, Spivak, McClelland, Maier & Neustadt, P.C.

[57] ABSTRACT

A detector 1, with its object of detection having operation characteristics that include a shift from a first state to a second state, outputs a signal e1 that corresponds to the operation characteristics of the object of detection. A first state detection circuit 2 generates a first output signal SA corresponding to the first state based upon the signal e1 provided by the detector 1. A second state detection circuit 3 generates a second output signal SB corresponding to the second state based upon the signal provided by the detector 1. The second output signal SB is generated only when the object of detection shifts from the first state to the second state in a normal manner while the first output signal SA is being generated. A state judgement circuit 4 generates a state judgement output signal Z on condition that there has been a period of time during which the first output signal SA and the second output signal SB have been both at high.

25 Claims, 15 Drawing Sheets

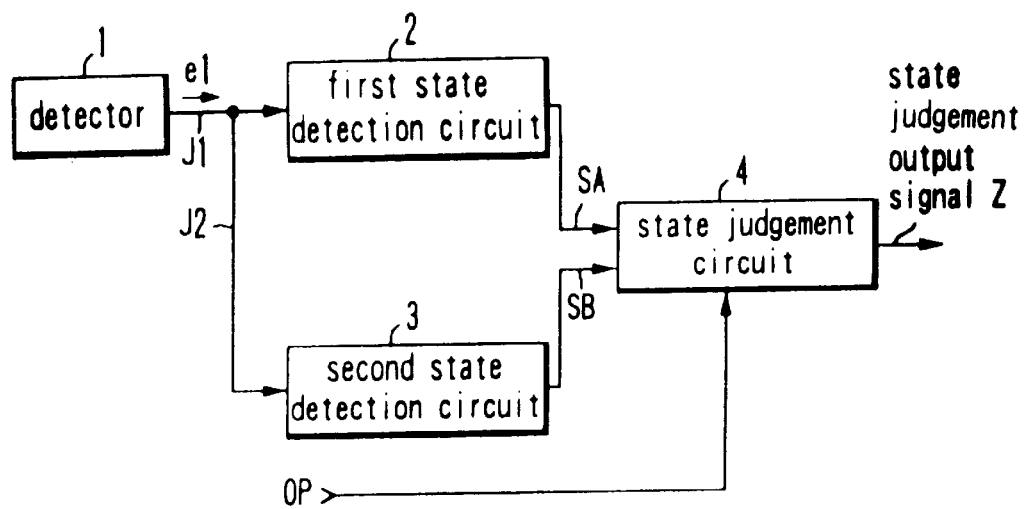
FIG. 1
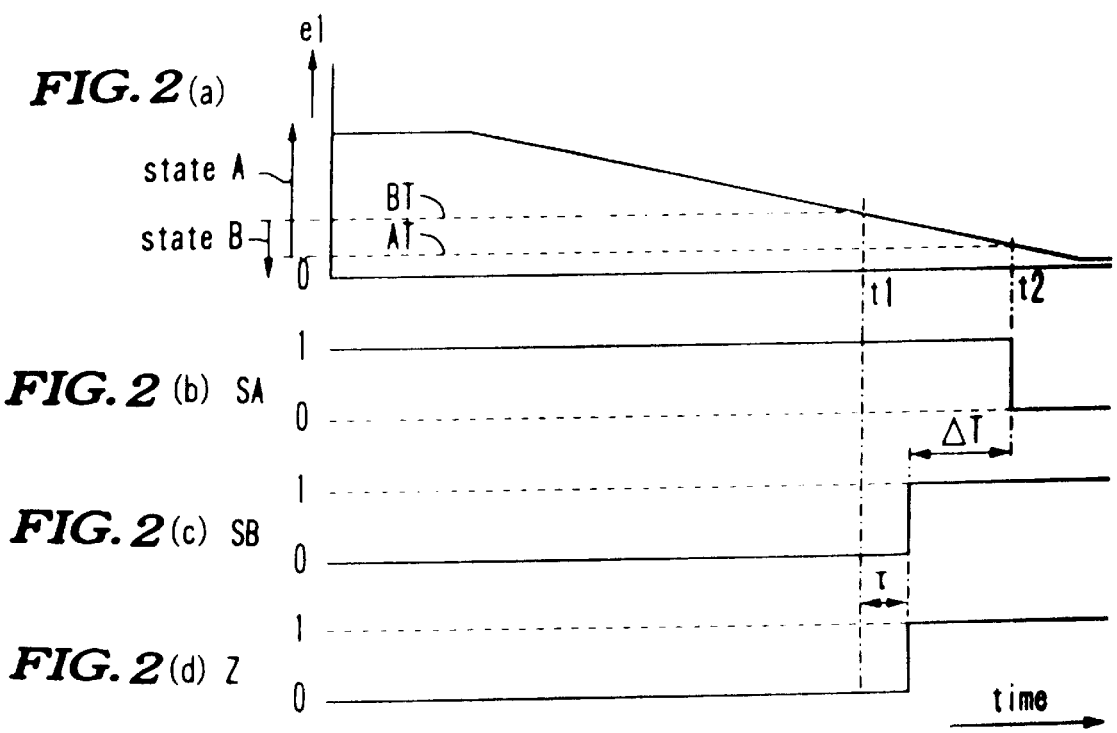

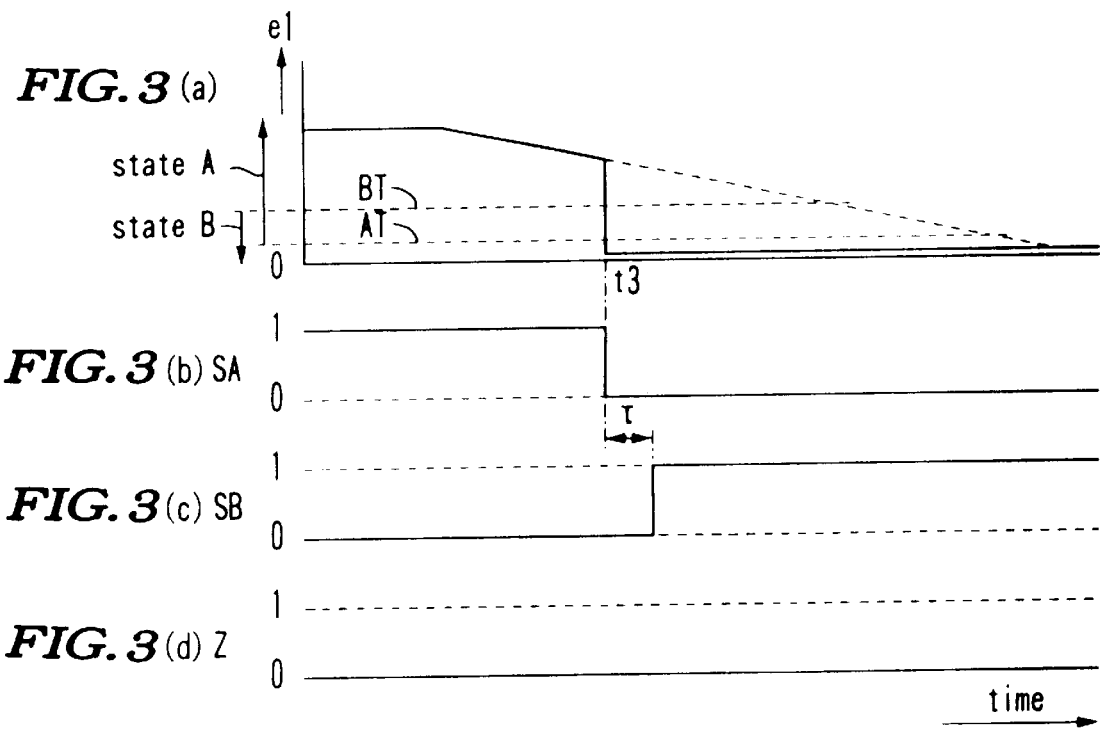
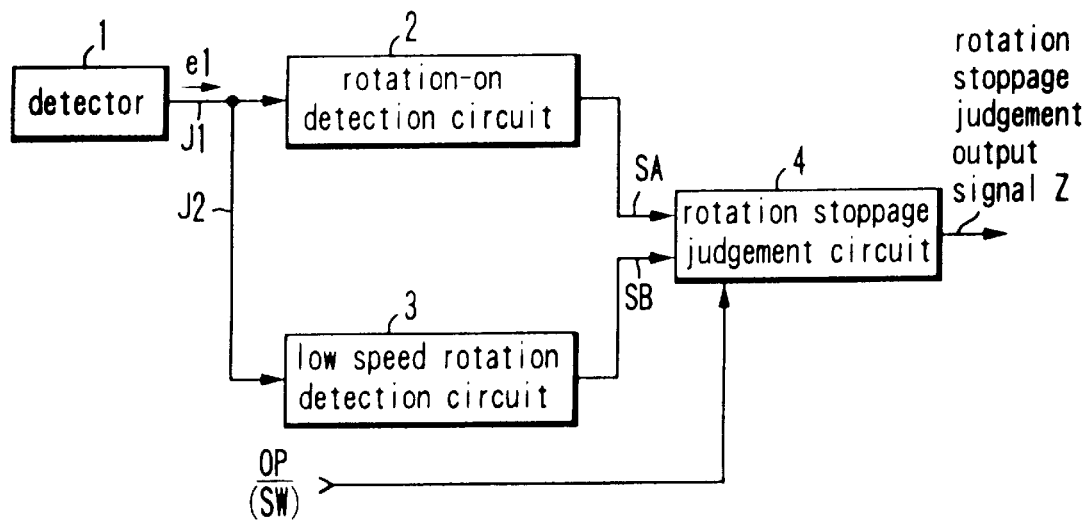
FIG. 4

TRANSITION DETECTION CIRCUIT FOR DETECTING TRANSITIONS IN THE STATE OF AN OBJECT OF DETECTION

This application is a 371 of PCT/JP96/00585 filed Mar. 8, 1996.

FIELD OF THE INVENTION

The present invention relates to a transition detection circuit that detects completion of a transition (no transition) in the state of an object of detection. The transition detection circuit according to the present invention may be widely adopted in safety related apparatuses. As a typical example of application, an apparatus that detects stoppage of rotation of a moving part, for instance, can be cited.

DISCUSSION OF THE BACKGROUND

A technology with which stoppage of a moving part is detected in a fail safe manner and distinguished from rotation under inertia is disclosed in, for instance, International Publication No. WO94/23303. Also, International Patent Application PCT/JP95/00165 discloses a technology for detecting in a fail safe manner that a moving part is rotating at or below a specific rotation rate.

International Publication No. WO94/23303 discloses a motor rotation stoppage verifying apparatus that is capable of reliably detecting that the rotation of a motor has stopped, including rotation under inertia, and operates toward safety when a failure has occurred in the apparatus, to provide a high degree of safety. However, since this apparatus in the prior art is not provided with a function for detecting the rotation rate, there are problems such as a delay in notification of stoppage and the need for adjustment of a bridge circuit that is employed in the rotation sensor.

International Patent Application PCT/JP95/00165 discloses a means for solving these problems. However, while the method disclosed in International Patent Application PCT/JP95/00165 is suitable for a case in which a coil is employed as a means for rotation detection, the publication does not disclose a general circuit structure suited to be used in various means for detection. In addition, it does not disclose a means for protection against drop-off of a transducer that determines rotation while a rotating body is in a stopped state.

SUMMARY OF THE INVENTION

It is an object of the present invention to provide a transition detection circuit that detects the completion of a transition (no transition) in the state of an object of detection in a fail safe manner while taking into consideration the possibility of an error in the means for detection or a circuit.

In order to achieve the object described above, the transition detection circuit according to the present invention includes a detector, a first state detection circuit, a second state detection circuit and a state judgement circuit. The detector outputs a signal that corresponds to the operation characteristics of an object of detection. These operation characteristics include a transition from a first state to a second state.

The first state detection circuit generates a first output signal that corresponds to the first state based upon a signal provided by the detector. The second state detection circuit generates a second output signal that corresponds to the second state based upon the signal provided by the detector. When the object of detection shifts from the first state to the second state in a normal manner, there is a period of time during which the first output signal and the second output signal are both at a high level.

The state judgement circuit generates a state judgement output signal on condition that there has been a period of time during which the first output signal and the second output signal were both at a high level.

According to the present invention, the only requirement imposed upon the object of detection is that it posseses operation characteristics that include a shift from a first state to a second state. Typical examples would be an object that undergoes a displacement such as a rotating body, a moving body and the like and an object that shifts from a first state to a second state in response to a change in pressure, temperature or the like.

Transition detection in regard to such an object of detection normally refers to detecting the completion of a transition from a first state to a second state. For instance, when the object of detection is a rotating body and stoppage of its rotation is to be detected, the first state and the second state may correspond to "rotation-on" and "rotation-off" respectively. In this case, detection of the completion of a transition from the first state, i.e., "rotation-on" to the second state, i.e., "rotation-off" is performed. In addition, when the object of detection operates in response to pressure, the first state and the second state may correspond to "pressure-on" and "pressure-off" respectively. In that case, detection of the completion of a transition from the first state, i.e., "pressure-on" to the second state, i.e., "pressure-off" is performed.

As a means for achieving the transition detection operation described above, in the present invention, the detector outputs a signal that corresponds to the operation characteristics of the object of detection which include a transition from a first state to a second state. Normally, the object of detection undergoes a gradual transition from the first state to the second state. Consequently, when the object of detection is normal, the signal output from the detector indicates a shifting pattern whereby it undergoes a gradual change between the first state and the second state.

The first state detection circuit generates a first output signal corresponding to the first state, based upon the signal provided by the detector. Normally, the first output signal from the first state detection circuit is set to a high level when the signal provided by the detector indicates the first state and is set to a low level in states other than the first state.

The second state detection circuit generates a second output signal corresponding to the second state, based upon the signal provided by the detector. The second output signal from the second state detection circuit, too, is normally set to a high level when the signal provided by the detector indicates the second state and is set to a low level in states other than the second state.

When the object of detection shifts from the first state to the second state in a normal manner, there is a period of time during which the first output signal output from the first state detection circuit and the second output signal output from the second state detection circuit are both at a high level.

The state judgement circuit generates a state judgement output signal on condition that there has been a period of time during which the first output signal and the second output signal were both at a high level.

In contrast, if an error has occurred in the object of detection and the object of detection has suddenly stopped, the signal output from the detector undergoes a radical transition between the first state and the second state.

Because of this, if an error has occurred in the object of detection, there is no period of time during which the first output signal output from the first state detection circuit and the second output signal output from the second state detection circuit are both at a high level. Thus, the state judgement circuit does not generate a state judgement output signal.

If there is an error such as a drop-off at the detector that determines a transition in the state of the object of detection while it is detecting the first state, the signal output from the detector changes radically from the first state to the second state. Thus, in this case, too, there is no period of time during which the first output signal output from the first state detection circuit and the second output signal output from the second state detection circuit are both at a high level and, consequently, the state judgement circuit does not generate a state judgement output signal.

If there is an error such as a disconnection in the connection circuit between the detector and the first state detection circuit or between the detector and the second state detection circuit, again, there is no period of time during which the first output signal and the second output signal are both at a high level and, as a result, the state judgement circuit does not generate a state judgement output signal.

In short, since the state judgement circuit generates a state judgement output only during a normal operation, in which there is a period of time during which the first output signal output from the first state detection circuit and the second output signal output from the second state detection circuit are both at high, completion of a transition (no transition) in the operating state of the object of detection can be detected in a fail safe manner while taking into account the possibility of an error in the detector and the circuits.

The concept of the present invention described above was contained in International Patent Application PCT/JP95/00675, previously filed by this applicant. The present application places a claim on the basic concept contained in International Patent Application PCT/JP95/00675 and newly discloses the structural aspects which were not included in International Patent Application PCT/JP95/00675.

BRIEF DESCRIPTION OF THE DRAWINGS

FIG. 1 is a block diagram of the transition detection circuit according to the present invention;

FIG. 2 is a time chart of the normal operation of the transition detection circuit shown in FIG. 1;

FIG. 3 is a time chart of the operation of the transition detection circuit shown in FIG. 1 at the time of an error;

FIG. 4 is a block diagram of a rotation stoppage detection apparatus that is an example of application of the transition detection circuit according to the present invention;

DESCRIPTION OF THE PREFERRED EMBODIMENTS

Figure 5:
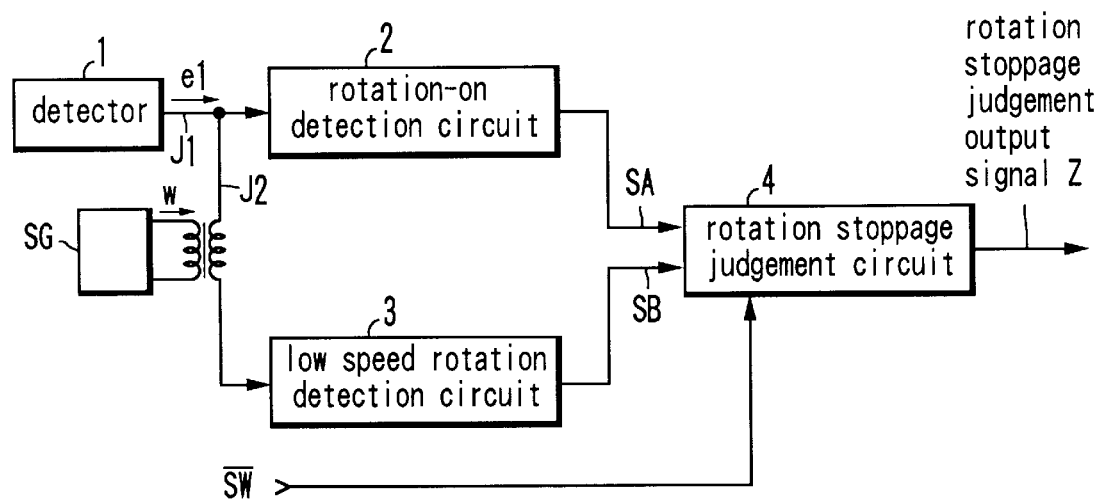
FIG. 5 is a block diagram of another embodiment of the rotation stoppage detection apparatus which is an example of application of the transition detection circuit according to the present invention.

In reference to FIG. 1, the transition detection circuit according to the present invention includes a detector 1, a first state detection circuit 2, a second state detection circuit 3 and a state judgement circuit 4.

The detector 1 outputs a signal e1 that corresponds to the operation characteristics of an object of detection (not shown) which has operation characteristics that include a shift from a first state to a second state.

Based upon the signal e1 provided by the detector 1, the first state detection circuit 2 generates a first output signal SA corresponding to a first state A. It is assumed that the first output signal SA from the first state detection circuit 2 is set to a high level when the signal e1 indicates the first state A and that it is set to a low level in states other than the first state A.

Also based upon the signal e1 provided by the detector 1, the second state detection circuit 3 generates a second output signal SB which corresponds to a second state B. It is assumed that the second output signal SB from the second state detection circuit 3, too, is set to high when the signal e1 indicates the second state B and that it is set to low in states other than the second state B.

The second output signal SB is generated when the object of detection shifts from the first state A to the second state B in a normal manner while the first output signal SA is being generated. In other words, when the object of detection shifts from the first state to the second state in a normal manner, there is a period of time during which the first output signal SA and the second output signal SB are both at a high level.

The first output signal SA and the second output signal SB are provided to the state judgement circuit 4. The state judgement circuit 4 then generates a state judgement output signal Z on condition that there has been a period of time during which the first output signal SA and the second output signal SB were both at a high level.

Next, the operation of the transition detection circuit according to the present invention shown in FIG. 1 is explained in a specific manner in reference to the time charts presented in FIGS. 2 and 3. FIG. 2 shows a time chart of a normal operation and FIG. 3 shows a time chart of an operation in which an error has occurred. In FIGS. 2 and 3, a logical value of 1 represents the high level for the first output signal SA and the second output signal SB whereas a logical value of 0 represents the low level. It is assumed that, normally, the state of the object of detection does not change radically, but changes gradually and that it undergoes a radical change only in the case of an error. For instance, if the object of detection is a rotating body it will, under normal circumstances, reduce speed gradually until it stops rotating. It will stop suddenly only at the time of an error such as a foreign object becoming lodged in the apparatus. In addition, if the object of detection operates in response to pressure, the pressure will be gradually reduced from high to low under normal circumstances. The pressure will drop rapidly only in the case of an error such as a rupture of a connecting pipe or the like connected to the pressure detector.

FIG. 2 (a) shows the change relative to time t that the signal e1 undergoes during a normal operation. The signal e1, represented on the vertical axis is typically a detection signal of rotation or pressure, for instance. The object of detection gradually shifts from the first state A to the second state B under normal circumstances. Consequently, when the apparatus is operating normally, the signal e1 output from the detector 1 assumes a shifting pattern whereby it undergoes a gradual change between the first state A and the second state B.

The first state detection circuit 2 generates the first output signal SA which corresponds to the first state A based upon the signal e1 provided by the detector 1 (see FIG. 2 (b)). The first output signal SA of the first state detection circuit 2 is set to a high level (logical value 1) when the signal e1 provided by the detector 1 indicates the first state A and it is set to a low level (logical value 0) in states other than the first state.

The second state detection circuit 3 generates the second output signal SB which corresponds to the second state B, based upon the signal e1 provided by the detector 1 (see FIG. 2 (c)). The second output signal SB from the second state detection circuit 3, too, is set to a high level (logical value 1) when the signal e1 provided by the detector 1 indicates the second state B and it is set to a low level (logical value 0) in states other than the second state.

The second output signal SB output from the second state detection circuit 3 is generated when the object of detection shifts from the first state A to the second state B in the normal manner (see FIG. 2 (a)) while the first output signal SA is being generated. Such a relationship is achieved by setting detection references so that a detection reference value AT of the first state detection circuit 2 at a level lower than a detection reference value BT of the second state detection circuit 3 (see FIG. 2 (a)). This will ensure that, preceding the time point t2, the logical value of the first output signal SA is at 1 and is set at 0 after the time point t2 and that the logical value of the second output signal SB is set at 1 at a time point (t1+τ) before the time point t2 and is held at 1 after the time point (t1+τ) (see FIG. 2 (c)). The logical value of the second output signal SB is at 0 before the time point (t1+τ).

While the signal e1 output from the detector 1 drops below the detection reference value BT of the second output signal SB from the second state detection circuit 3 at the time point t1, if it is assumed that there is a delay time τ after the time point t1 until the second output signal SB output from the second state detection circuit 3 is set to a high level, the logical value of the second output signal SB is set to 1 at the time point (t1+τ).

As has been explained, when the object of detection shifts from the first state A to the second state B in a normal manner, there is always a time period ΔT during which the first output signal SA and the second output signal SB are both at a high level (logical value 1). This time period ΔT corresponds to the time elapsing from the time point (t1+τ) to the time point t2 in FIG. 2.

The state judgement circuit 4 generates the state judgement output signal Z on condition that there has been a time period ΔT during which the first output signal SA and the second output signal SB have both been at high (logical value 1) (see FIG. 2 (d)).

Next, in reference to FIG. 3, an explanation of a case in which an error has occurred is given. When an error has occurred in the object of detection resulting in the object of detection coming to a sudden stop, the signal e1 output from the detector 1 undergoes a radical change between the first state A and the second state B (see FIG. 3 (a)). Because of this, if there has been an error in the object of detection, the signal e1 output from the detector 1 will drop to a level (logical value 0) lower than the detection reference value AT of the first output signal SA. Thus, the first output signal SA output from the first state detection circuit 2 is set to a low level (logical value 0) at a time point t3, at which the error has occurred (see FIG. 3 (b)).

At the time point t3, the second output signal SB from the second state detection circuit 3 is at a low level (logical value 0) (see FIG. 3 (c)). While the signal e1 output from the detector 1 is set lower than the detection reference value AT at the time point t3, since the delay time τ is required for the second output signal SB output from the second state detection circuit 3 to be set to a high level (logical value 1) as explained earlier, the second output signal SB is still at a low level (logical value 0) at the time point t3 (see FIG. 3 (c)).

As is obvious from the explanation given above, when there has been an error, there is no time period ΔT during which the first output signal SA output from the first state detection circuit 2 and the second output signal SB output from the second state detection circuit 3 are both at a high level. Consequently, the state judgement circuit 4 does not generate a state judgement output signal Z.

In addition, if an error such as the transducer constituting the detector 1 dropping off or the like has occurred while the signal e1 output from the detector 1 is indicating the first state A, too, the signal e1 undergoes the transition shown in FIG. 3. As a result, in the case of such an error, the state judgement circuit 4 does not generate a state judgement output signal Z.

If there is a disconnection failure in a signal line J1 connecting the detector 1 and the first state detection circuit 2 and also connecting the detector 1 and the second state detection circuit 3, since there is no time period ΔT during which the first output signal SA and the second output signal SB are both at a high level, the state judgement circuit 4 does not generate a state judgement output signal Z.

Ultimately, the state judgement circuit 4 generates the state judgement output signal Z only under normal circumstances, in which there is the time period ΔT during which the first output signal SA output from the first state detection circuit 2 and the second output signal SB output from the second state detection circuit 3 are both at high. Thus, completion of a transition of the operating state of the object of detection can be detected in a fail safe manner while taking into account the possibility of an error in the detector 1 or the circuits.

It is assumed that the detection reference value AT of the first state detection circuit 2 does not become lowered erroneously due to a failure. It is also assumed that the detection reference value BT of the second state detection circuit 3 does not increase erroneously due to a failure or the like. This means that in the case of rotation stoppage detection, for instance, the first state A corresponding to "rotation-on", a rotation-on output is not sustained toward the lower speed rotation side erroneously due to a failure or the like and that with the second state B corresponding to low speed rotation/stoppage, the low speed detection is not performed erroneously starting from the higher speed rotation side due to a failure or the like.

Furthermore, the state judgement circuit 4 has characteristics whereby it does not erroneously generate the state judgement output signal Z if there is not a time period ΔT during which the first output signal SA and the second output signal SB are both at a high level or if the second output signal SB is not at high. Consequently, it does not indicate the second state B erroneously even if the state indicated by the signal e1 is fixed at the first state A.

As has been described earlier, the second state detection circuit 3 generates the second output signal SB with a logical value of 1 when the delay time τ has elapsed after the level of the signal e1 drops below the detection reference value BT to indicate the second state B. While, in the embodiment, the function of providing the second output signal SB with the delay time τ is achieved by the second state detection circuit 3, this function may be achieved by the state judgement circuit 4. In either case, it is assumed that the delay time τ is not erroneously reduced due to a failure or the like.

In addition, the signal e1 provided by the detector 1 to the first state detection circuit 2 and the signal e1 provided by the detector 1 to the second state detection circuit 3 do not necessarily have to be the same signal but may be any signal containing the essential component of the signal e1. Furthermore, a structure in which the essential component of the signal e1 is provided to the second state detection circuit 3 via the first state detection circuit 2 and a structure in which the signal path is reversed are also conceivable.

If, due to a failure in the detector 1 or the like, the state indicated by the signal e1 is fixed at the second state B, state detection can no longer be performed based upon the information provided by the signal e1, since, assuming that the first state A signifies danger and that the second state B signifies safety, there is the likelihood of erroneously notifying a second state B although the object of detection is actually in the first state A. As a means for preventing such a situation, in the embodiment shown in FIG. 1, a signal OP is separately input to the state judgement circuit 4. The signal OP, like the signal e1, indicates the state of the object of detection. More specifically, an operation instruction signal or a signal which indicates the presence/absence of an electric current to be supplied to the object of detection or the like may be employed for the signal OP. In this embodiment, it is assumed that the signal OP at a high level (logical value 1) indicates the second state B and that the signal OP at a low level (logical value 0) indicates the first state A. The state judgement circuit 4 is structured in such a manner that it generates the state judgement output signal Z with a logical value of 1 only when the logical value of the signal OP is at 1.

In this structure, when the object of detection enters the first state A, the logical value of the signal OP is set to 0, which, in turn, sets the logical value of the state judgement output signal Z to 0, precluding the likelihood of the signal indicating the second state B (safety) erroneously. Although not shown, the present invention may employ a structure in which the signal OP is input to the second state detection circuit 3 to be used as a condition for generating the second output signal SB with a logical value of 1.

FIG. 4 shows an example of the basic structure of the transition detection circuit according to the present invention shown in FIG. 1 adopted in a rotation stoppage detection circuit. In this example, the first state A corresponds to rotation-on and the second state B corresponds to rotation-off or low speed rotation, which may be considered as rotation-off (hereafter referred to as rotation-off). The detector 1 outputs the signal e1 with a frequency corresponding to the rotation of the moving part. A low speed rotation detection circuit 3 corresponds to the second state detection circuit 3 in FIG. 1 and rotation-on detection circuit 2 corresponds to the first state detection circuit 2 shown in FIG. 1. A rotation stoppage judgement circuit 4 corresponds to the state judgement circuit 4 shown in FIG. 1.

The second output signal SB is set to a high level (logical value 1) when the rotation rate of the moving part which is indicated by the signal e1 is at or lower than a specific rate VBT. In addition, the first output signal SA is set to a high level (logical value 1) when the rotation rate of the moving part which is indicated by the signal e1 is at or higher than a specific rate VAT. As explained earlier, VBT>VAT>0 is satisfied and the rotation stoppage judgement circuit 4 detects that there has been a period of time during which the logical values of the first output signal SA and the second output signal SB have been both at 1 and, based upon this detection, generates a rotation stoppage judgement output signal Z.

In the embodiment shown in FIG. 4, when there is a disconnection failure in the signal line J1, the rotation stoppage judgement output signal Z is not output as explained earlier and, consequently, an erroneous stoppage notification is not issued. However, if there is a disconnection failure in the signal line J2, since the change in the signal e1 is not communicated to the low speed rotation detection circuit 3 even if the rotating body is rotating, the rotation is assumed to have stopped, resulting in the second output signal SB with a logical value of 1 being generated. In contrast, the signal e1 is communicated to the rotation-on detection circuit 2 and during rotation the logical value of the first output signal SA is set to 1. Because of this, the rotation stoppage judgement circuit 4 detects that the logical values of the first output signal SA and the second output signal SB have been at 1 at the same time and generates an erroneous rotation stoppage judgement output signal Z with a logical value of 1 even during rotation.

FIG. 5 presents a structure in which this problem is solved. In FIG. 5, a signal generator SG is provided so that a signal w, output from the signal generator SG, is provided to the signal line J2. With this, a signal achieved by superimposing the signal w on the signal e1 is provided to the low speed rotation detection circuit 3. This signal w plays the role of a disconnection check signal for the signal line J2 and the low speed rotation detection circuit 3 generates a second output signal SB with a logical value of 1 only when an essential component of the signal w is being input. If a disconnection failure occurs in the signal line J2, since the signal w is not input to the low speed rotation detection circuit 3, the second output signal SB with a logical value of 1 is not generated erroneously.

A wide variety of transducers may be employed as the detector 1 for extracting the rotation of the moving part.

Figure 6:
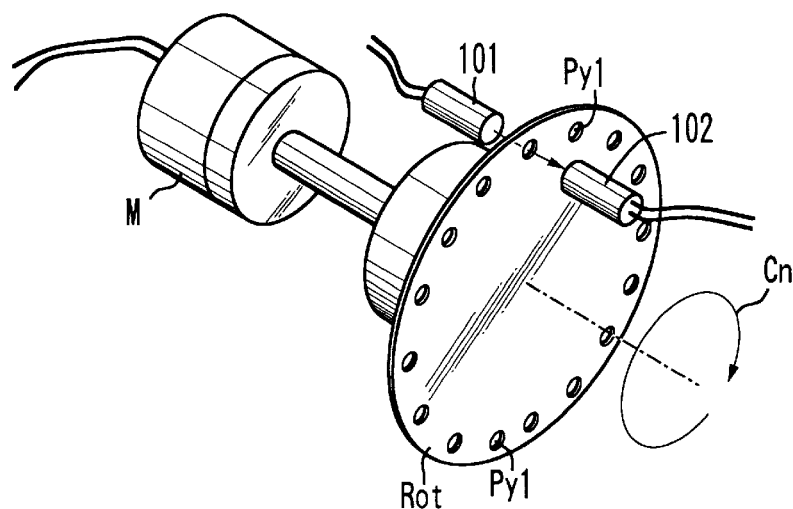
FIG. 6 is a perspective view of an example of the detector which may be adopted in the transition detection circuit according to the present invention.
Figure 7:
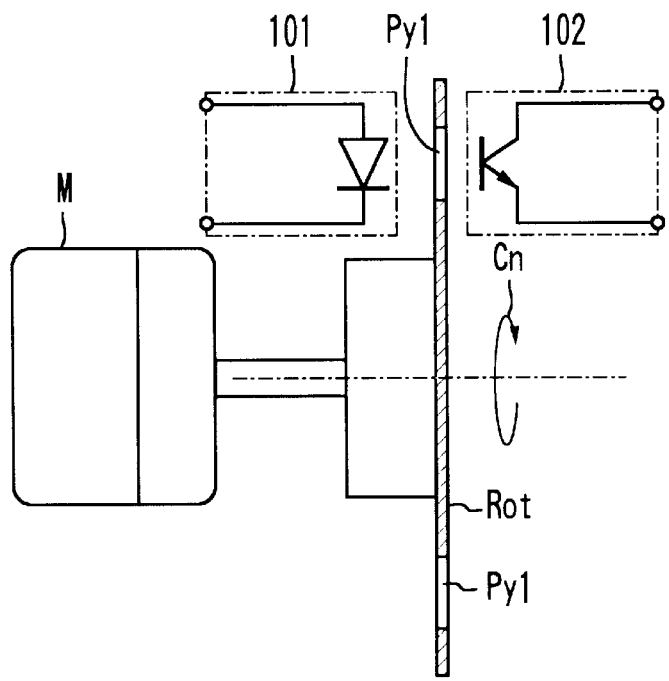
FIG. 7 is a partial cross section of the detector shown in FIG. 6.

FIGS. 6 and 7 show an instance in which a photosensor is employed as the transducer constituting the detector 1. The photosensor comprises a light projector 101 and a light receiver 102. A light beam generated by the light projector 101 is switched depending upon the presence/absence of a hole Py1 in the rotating body Rot which rotates in the direction indicated with the arrow Cn. A switching light, which is switched in correspondence to the rotation rate of the rotating body Rot, reaches the light receiver 102 so that it can generate an output signal in correspondence to the switching light received. The rotating body Rot is mounted at a rotating shaft of a motor M and is driven in the direction indicated with the arrow Cn.

Figure 8:
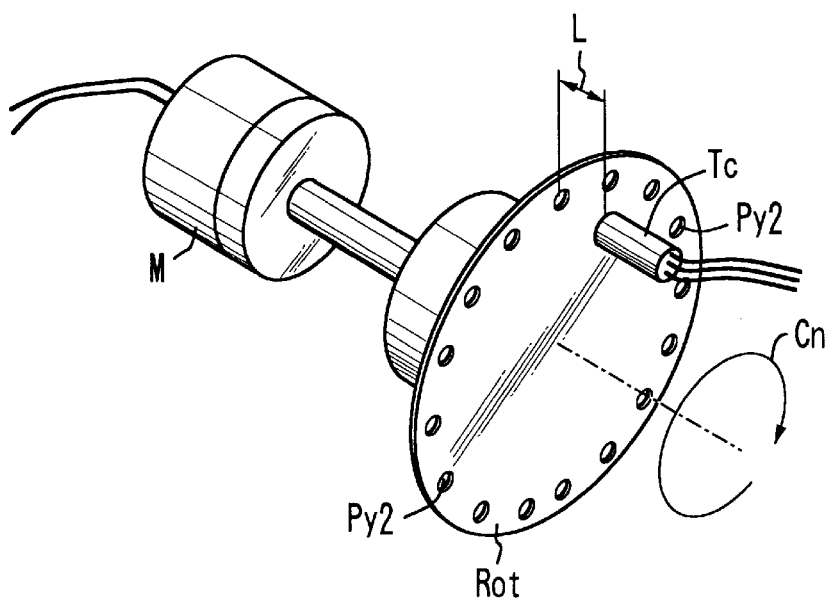
FIG. 8 is a perspective view of another example of the detector which may be adopted in the transition detection circuit according to the present invention.
Figure 9:
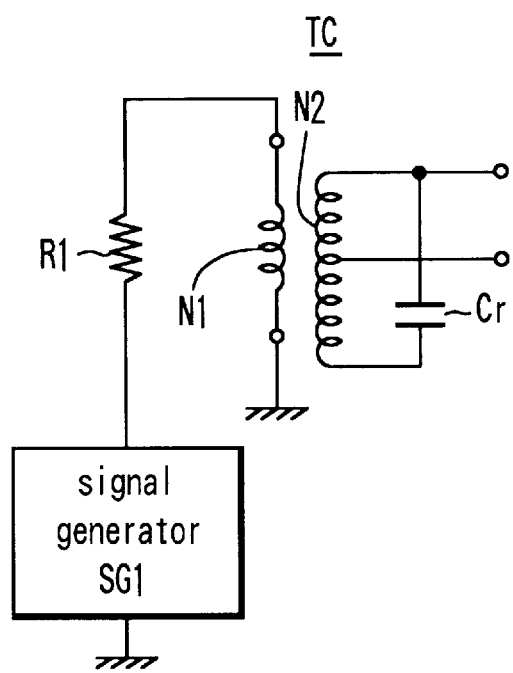
FIG. 9 is an electric circuit diagram of the detector shown in FIG. 8.

FIG. 8 shows an instance in which an electromagnetic induction coil is employed as the transducer constituting the detector 1. FIG. 9 is an electric circuit diagram of the detector 1 shown in FIG. 8. The electromagnetic induction coil (hereafter referred to as the coil) TC is provided with windings N1 and N2, as shown in FIG. 9. It is desirable that, together with winding inductance and a capacitor Cr, it constitute a resonance circuit. At least the surface of the rotating body Rot that faces opposite the coil TC is constituted of a metal material. The resonance frequency of the coil TC and the Q of the resonance circuit change according to the presence/absence of a hole Py2 in the rotating body Rot, and an output signal with a frequency which corresponds to the rotation rate of the rotating body Rot is generated. These features are disclosed in International Patent Application PCT/JP95/00675. However, the transducers that may be employed in the present invention are not restricted to those in these embodiments. Basically, the only requirement imposed upon them is that they be capable of outputting an AC signal that corresponds to the rotation of the moving part.

Now, if one such transducer drops off or is removed, for instance, while the rotation is stopped, the resumption of rotation cannot be detected and the stopped state will be continuously indicated erroneously. As a means for eliminating this problem, in the embodiment shown in FIGS. 4 and 5, a signal $\overline{SW}$ is separately input to the rotation stoppage judgement circuit 4. This signal $\overline{SW}$ may be provided in the form of a back-terminal signal of the operating switch which is operated to control the rotating body, or a current off signal which indicates that no current is running through the motor that drives the rotating body, for instance. A sensor that detects a current off state is disclosed, for instance, in U.S. Pat. No. 5,345,438. The explanation given in reference to this example relates to a case in which a back-terminal signal of the operating switch is employed as the signal $\overline{SW}$.

For instance, when the code SW is assigned to the signal that is achieved when the operating switch is connected to an on-terminal, since the state of the back-terminal, which forms a pair together with the on-terminal, corresponds to its denial, it can be expressed as the signal $\overline{SW}$. The back-terminal of the operating switch is turned off (logical value 0) when the motor that drives the rotating body is driven and is turned on (logical value 1) when the motor is not driven. The signal $\overline{SW}$ at high (logical value 1) is provided to the rotation stoppage judgement circuit 4 via this back-terminal. Thus, it is ensured that the rotation stoppage judgement output signal Z with a logical value of 1 is generated only when the high level signal $\overline{SW}$ with a logical value of 1 is input.

In the structure described above, at the time of a restart of rotation, the signal $\overline{SW}$ at low level with a logical value of 0 is provided to the rotation stoppage judgement circuit 4 and the logical value of the rotation stoppage judgement output signal Z output from the rotation stoppage judgement circuit 4 is set to 0. As a result, even if the transducer has dropped off while the operation is in a stopped state, the rotation stoppage judgement output signal Z with a logical value of 1, which indicates rotation stoppage, can be prevented from being generated erroneously at a restart of rotation.

In place of the back-terminal of the operating switch, by monitoring the electric current running through the motor with the signal $\overline{SW}$ with a logical value of 1 output when no electric current is running and the signal $\overline{SW}$ with a logical value of 0 output when an electric current is running, the signal $\overline{SW}$ with a logical value of 0 is concurrently provided to the rotation stoppage judgement circuit 4 at the time of a restart of rotation and thus it is possible to secure a similar protective function.

In addition, although not shown in FIGS. 4 and 5, the signal $\overline{SW}$ may be input to the low speed rotation detection circuit 3 to be used as a condition for generating the second output signal SB with a logical value of 1.

Figure 10:
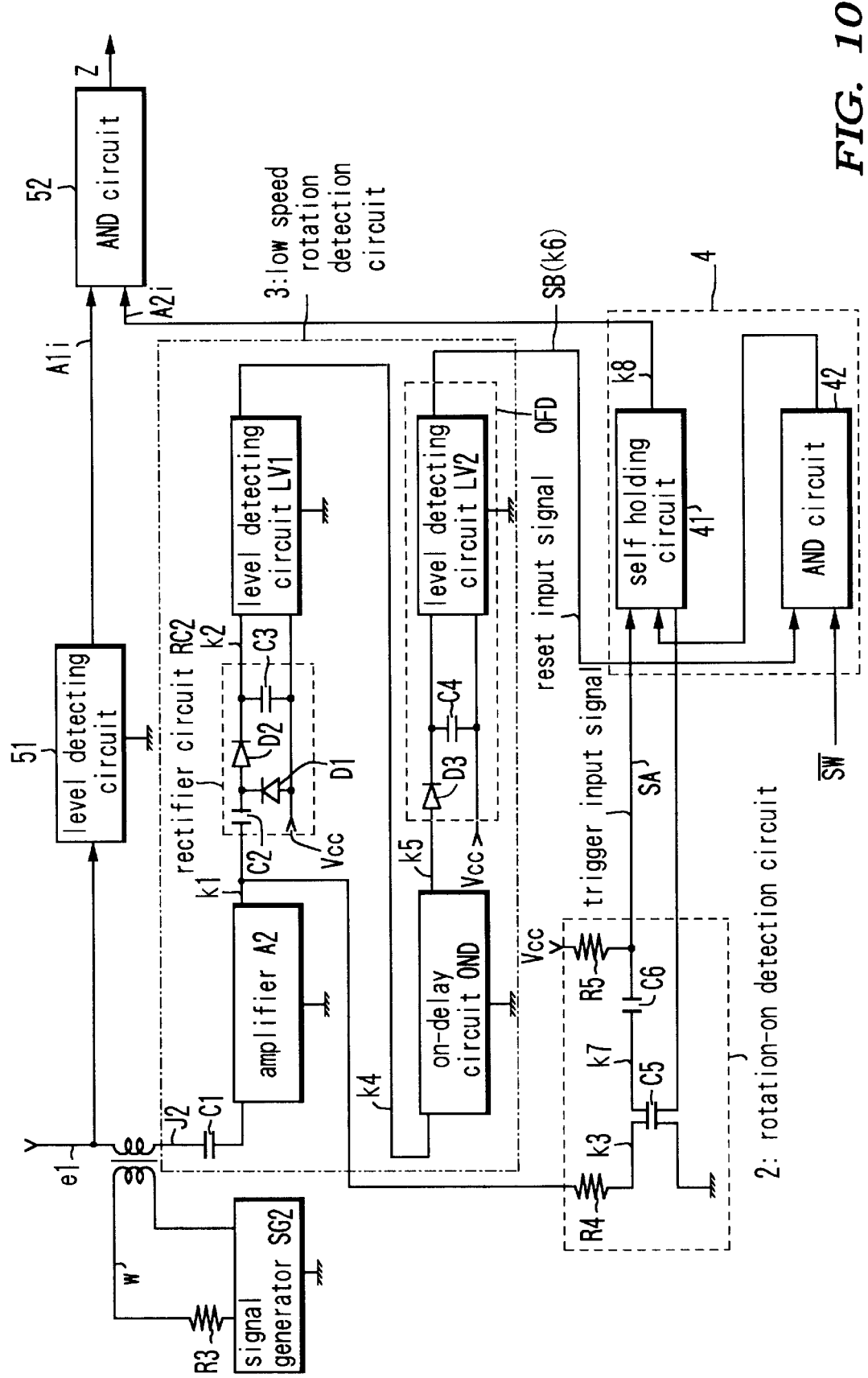
FIG. 10 is an electric circuit diagram showing a specific structure of the transition detection circuit according to the present invention.
Figure 11:
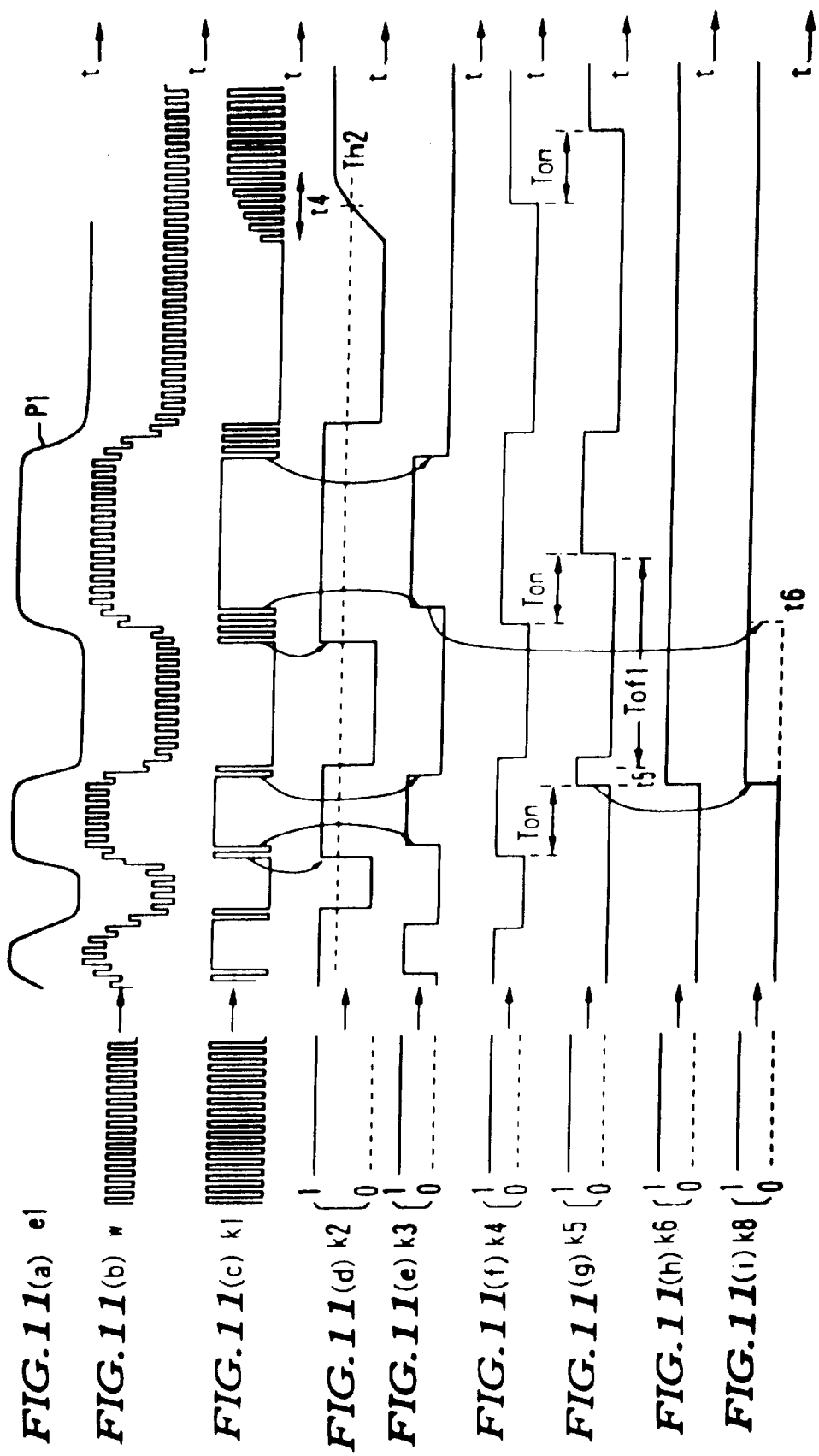
FIG. 11 is a time chart illustrating the operation of the transition detection circuit shown in FIG. 10.

FIG. 10 shows a specific example of the transition detection circuit according to the present invention shown in FIG. 5. FIG. 11 shows a time chart which illustrates the operation of the transition detection circuit shown in FIG. 10.

The primary structure of the circuit illustrated in FIG. 10 and the time chart presented in FIG. 11 are essentially included in International Patent Application PCT/JP95/00675.

In FIG. 10, the same reference numbers as those in FIG. 5 indicate identical components. The signal e1 from the detector 1 is input to the low speed rotation detection circuit 3 via a capacitor C1. In addition, a signal w is also provided to the low speed rotation detection circuit 3 from a signal generator SG2. The signal e1 thus input is as shown in FIG. 11 (b). This signal e1 is amplified at an amplifier A2 to become the signal k1 (see FIG. 11 (c)) and is provided to a rectifier circuit RC2 provided at a rearward stage and to the rotation-on detection circuit 2.

The signal w superimposed upon the signal e1 is almost completely suppressed while the signal e1 is changing in correspondence to the rotation, and the signal e1 is amplified and output. The coupling capacitor C2 of the rectifier circuit RC2 has a large capacity whereas the capacitor C3 has a small capacity with low impedance relative to the signal w, which is a high frequency signal. Consequently, the rectifier circuit RC2 outputs a signal k2 which is achieved by shifting the DC level of the input signal k1 by a value equivalent to a source voltage Vcc while maintaining the waveform of the signal k1 almost unchanged (see FIG. 11 (d)).

A level detecting circuit LV1 has a threshold value and if the signal k2 indicates a value at or over this threshold value, it generates a high level signal k4 (see FIG. 11 (f)). An on-delay circuit OND generates a high level output signal k5 when the high level sustaining period of the signal k4 is at or over a preset time period ΔTon (see FIG. 11 (g)). When the rotation rate of the rotating body is at or above a specific rate, the high level sustaining period of the signal k4 is approximately the same as that of the signal e1 and a signal k5 is not generated whereas when the rotation rate of the rotating body drops under a specific rate and the high level sustaining period of the signal k4 is at or over the sustaining time Ton, the signal k5 is generated (see FIG. 11 (g)).

The signal k5 is input to level detecting circuit LV2 via an off-delay circuit which is constituted with a diode D3 and a capacitor C4. As shown in FIG. 11 (g), the off-delay circuit is provided to maintain a signal k6 at high for a specific length of time even when the signal k5 is set to low again after the high level signal k5 is generated (see FIG. 11 (h)). In other words, as shown in FIG. 11 (g), there is an output dissipation time Tof1 in the signal k5 after it is set to high and during this period of time, the off-delay circuit maintains the signal k6 at high. The signal k6 is equivalent to the second output signal SB shown in FIGS. 4 and 5.

The level detecting circuit LV2 is provided to increase the output load resistance of the off-delay circuit compared to that in a structure in which it is directly connected to an AND circuit 42. If the capacitor C4 can be sufficiently large, the output from the off-delay circuit may be directly input to the AND circuit 42.

The essential component of the signal w contained in the signal k1 that has been input to the rotation-on detection circuit 2 is attenuated by a low pass filter that is constituted with a resistor R4 and a capacitor C5. Then, the signal k3 (see FIG. 11 (e)) obtained through the low pass filter is input to a level shift circuit (rise differentiating circuit) constituted with a capacitor C6 and a resistor R5 and is input to a self holding circuit 41 as a trigger input signal whose level is higher than that of the source voltage Vcc. This trigger input signal corresponds to the first output signal SA shown in FIGS. 4 and 5.

When the rotating body is in a stopped state, the signal e1 does not change and the high frequency signal w is amplified as the signal k1. When this happens, the first output signal SA (trigger input signal) must not be generated, as explained earlier. Because of this, the component w of the signal k1 is attenuated through the low pass filter constituted with the resistor R4 and the capacitor C5 to ensure that it is not output as a trigger input signal.

The rotation stoppage judgement circuit 4 comprises the self holding circuit 41 and a first AND circuit 42. The AND circuit 42 outputs a high level output signal to the self holding circuit 41 only when the signal k6 and the signal $\overline{SW}$ are both high level signals. For instance, when the signal $\overline{SW}$ is set to low, the output from the AND circuit 42 is also set to low, which, in turn, sets the output from the self holding circuit 41 to low. Consequently, even if the signal k6 erroneously remains high due to a drop-off at the transducer or the like, since the state of the rotating body is extracted by the signal $\overline{SW}$, it is possible to prevent the self holding circuit 41 from continuously issuing an erroneous stoppage notification. The signal $\overline{SW}$ may be input to the low speed rotation detection circuit 3 to be used as a condition for generating the signal k6 with a logical value of 1. To be more specific, the AND of the signal $\overline{SW}$ and the output signal k4 from the level detecting circuit LV1 may be used or the AND of the signal SW and the signal k5 may be used. In such a case, it is not necessary to calculate the AND of the signal $\overline{SW}$ and the signal k6 and the signal k6 can be directly input to the self holding circuit 41.

The self holding circuit 41 generates a high level signal k8 when a trigger input signal is input by the rotation-on detection circuit 2 after the high level signal from the AND circuit 42 has been input as a reset input signal (see FIG. 11 (i)).

When the rotating body stops, the signal k1 achieved by amplifying the high frequency signal w is output. This signal k1 is rectified at the rectifier circuit RC2 to generate a high level signal k2, and through the level detecting circuit LV1, the on-delay circuit OND, the off-delay circuit and the level detecting circuit LV2, a high level signal k6 is continuously generated. Since, when the rotating body is in a stopped state, the signal $\overline{SW}$ is also at high, a high level signal k8 is continuously generated.

In the embodiment shown in FIG. 10, the signal generator SG2 is provided so that the signal w output from the signal generator SG2 is provided to the signal line J2. With this, a signal achieved by superimposing the signal w on the signal e1 is provided to the low speed rotation detection circuit 3. As explained earlier, this signal w plays the role of a disconnection check signal for the signal line J2, and the low speed rotation detection circuit 3 generates the second output signal SB with a logical value of 1 only when the essential component of the signal w is input. When there is a disconnection failure in the signal line J2, the signal w is not input to the low speed rotation detection circuit 3 and, consequently, the second output signal SB with a logical value of 1 is not erroneously generated.

However, when the signal w is not provided due to a failure in the signal generator SG2 although the signal line J2 is in a normal state, only the signal e1 from the detector 1 is provided to the low speed rotation detection circuit 3. In that case, when the rotation rate of the rotating body is reduced and the frequency of the signal e1 is lowered to or below a specific frequency, the output signal SB is set to high. Then, after the rotation of the rotating body stops and the signal e1 becomes a signal with a frequency of 0, since the signal w is not provided by the signal generator SG2, the output signal SB is set to low with a delay that corresponds to the off-time set by the off-delay circuit OFD.

When the signal w is not provided due to a failure in the signal generator SG2 although the signal line J2 is in a normal state, since at least the signal e1 is provided by the detector 1, it may be assumed that no significant problem arises even when the output signal SB is set to high. However, it must be ensured that the output signal SB is never set to low after the signal e1 becomes a signal with a frequency of 0 due to the stoppage of rotation of the rotating body.

Figure 12:
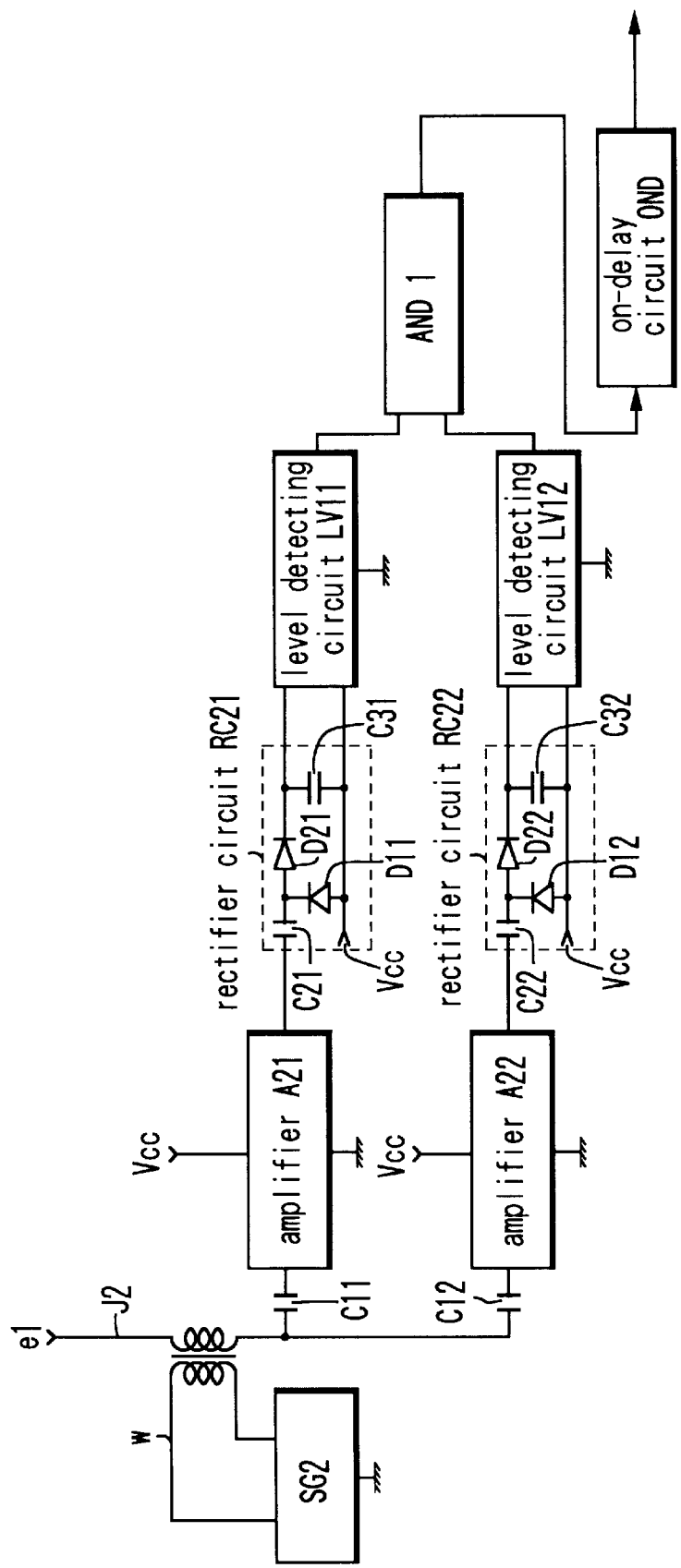
FIG. 12 is an electric circuit diagram of another embodiment of the low speed rotation detection circuit included in the transition detection circuit according to the present invention shown in FIG. 10.
Figure 13:
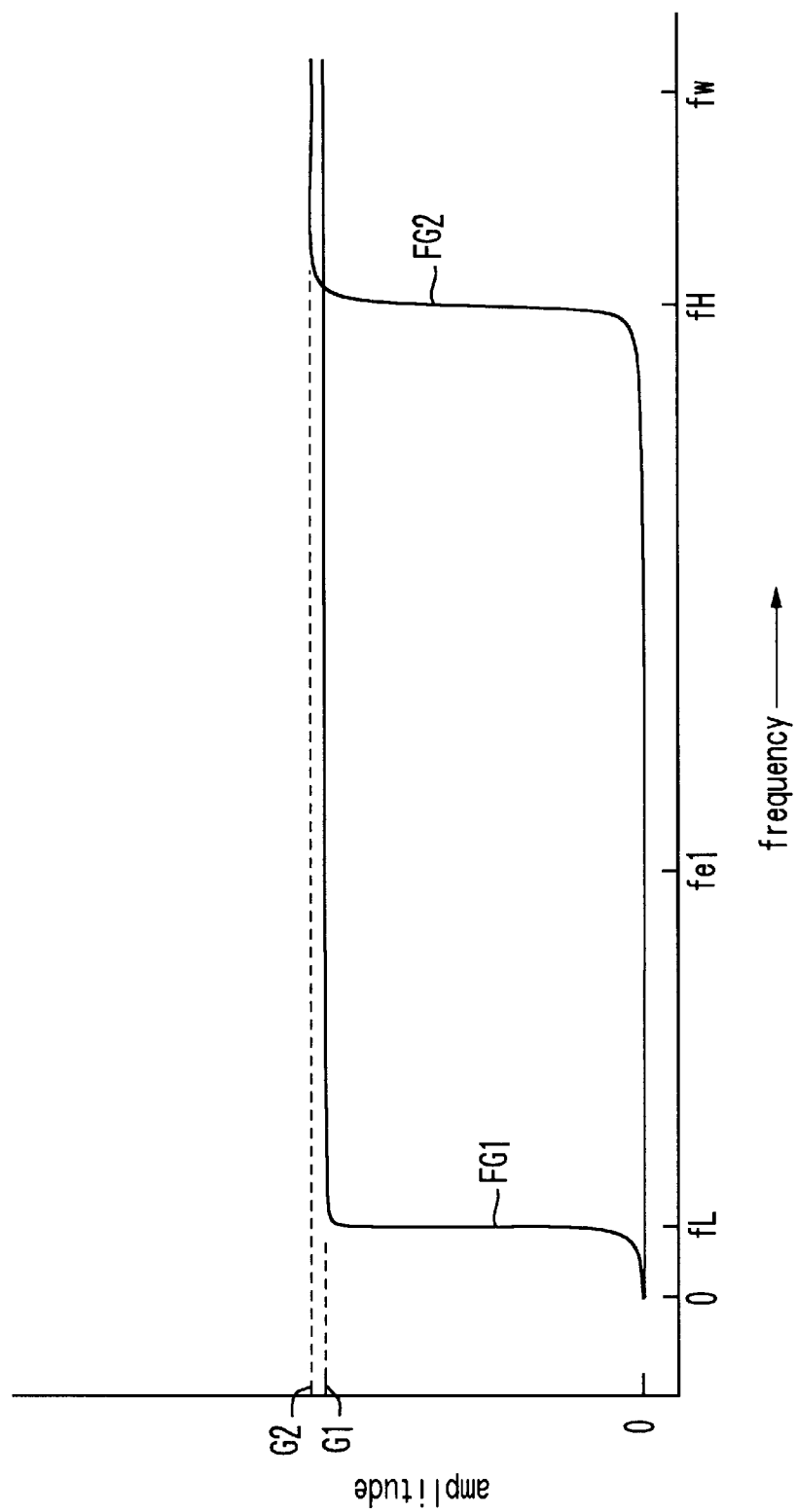
FIG. 13 is a frequency-amplitude characteristics diagram illustrating the operation of the circuit shown in FIG. 12.

Next, an embodiment which deals with a disconnection in the signal line J2 and a failure in the signal generator SG2 is explained in reference to FIGS. 12 and 13.

FIG. 12 is an electric circuit diagram of another embodiment of the low speed rotation detection circuit 3 included in the transition detection circuit according to the present invention shown in FIG. 10, and FIG. 13 is a frequency-amplitude characteristics diagram illustrating the operation of the circuit shown in FIG. 12.

In FIG. 12, the low speed rotation detection circuit 3 includes a first circuit achieved by providing a capacitor C11, an amplifier A21, a rectifier circuit RC21 and a level detecting circuit LV11 in cascade connection, a second circuit achieved by providing a capacitor C12, an amplifier A22, a rectifier circuit RC22 and a level detecting circuit LV12 in cascade connection and an AND circuit AND1.

One end of each of the capacitors C11 and C12 is connected to the signal line J2 through which a superimposed signal obtained by superimposing the signal w provided by the signal generator SG2 on the signal e1 provided by the detector 1 (see FIG. 10 and the like). The AND circuit AND1 outputs the AND of the output from the level detecting circuit LV11 constituting the first circuit and the output from the level detecting circuit LV12 constituting the second circuit. The output from the AND circuit AND1 is provided to the on-delay circuit OND. The on-delay circuit OND is identical to that shown in FIG. 10.

FIG. 13 shows the frequency-amplitude characteristics of an amplifier circuit constituted with the capacitor C11 and the amplifier A21 and the frequency-amplitude characteristics of an amplifier circuit constituted with the capacitor C22 and the amplifier A22. In FIG. 13, the vertical axis represents the amplitude and the horizontal axis represents the frequency. The frequency fe1 is the frequency of the signal e1 whereas the frequency fw is the frequency of the signal w. These frequencies satisfy a relationship expressed as fe1<fw. Frequencies fL and fH are to be referred to as cut-off frequencies.

The curve FG1 in FIG. 13 indicates the frequency characteristics of the amplifier circuit constituted with the capacitor C11 and the amplifier A21, whereas the curve FG2 indicates the frequency characteristics of the amplifier circuit constituted with the capacitor C22 and the amplifier A22. The capacitances of the capacitors C11 and C12, the input resistances of the amplifiers A21 and A22 and the like should be selected in such a manner that the frequency-amplitude characteristics shown in FIG. 13 are achieved.

As shown in FIG. 13, at the amplifier A21, which constitutes the first circuit, an amplitude G1 (saturation) is achieved at a fairly low frequency fL, whereas at the amplifier A22, an amplitude G2 (saturation) is achieved at the frequency fH (fH<fw) which is higher than the frequency fe1. As a result, the amplifier A22 only amplifies the signal w.

In the circuit structure described above, the signal w is amplified to the amplitude G2 by the amplifier A22 in a normal state in which the signal w is provided. The amplified output from the amplifier A22 is then rectified at the rectifier circuit RC22. A level detection is performed on the rectified output from the level detecting circuit LV12 and a high level signal is provided by the level detecting circuit LV12 to the AND circuit AND1.

The signal w is amplified to the amplitude G1 by the amplifier A21. The amplified output is then rectified at the rectifier circuit RC21. A level detection is performed on the rectified output from the level detecting circuit LV11 and a high level signal is provided by the level detecting circuit LV11 to the AND circuit AND1.

Consequently, in a normal state, while the signal w is being provided, with the input of the high level signals provided by the level detecting circuits LV11 and LV12, the AND circuit AND1 outputs a high level signal. This output signal is provided to the on-delay circuit OND. The operation of the on-delay circuit OND and the subsequent circuit operation are identical to the circuit operation shown in FIG. 10.

Next, if the signal w is not provided due to a disconnection in the signal line J2, a failure in the signal generator SG2 or the like, an output from the rectifier circuit RC22 which is connected at a rearward stage relative to the amplifier A22, is at low and the output from the level detecting circuit LV12, too, is at low. As a result, the output from the AND circuit AND1 is not set to high.

As is obvious from the explanation given above, the AND circuit AND1 is inserted in order to verify whether or not the signal w, which represents a condition for setting the output signal SB from the low speed rotation detection circuit 3 to high, is being input. Thus, the position of the AND circuit AND1 is not restricted to that shown in FIG. 12 as long as this function is fulfilled. For instance, it may be provided at a stage rearward of the on-delay circuit OND.

It must be ensured that in a failure or the like, the amplifier A22 does not amplify the signal e1 causing the rectifier circuit RC22 to generate a high level rectified output. Therefore, the cut-off frequency fH of the amplifier circuit constituted with the capacitor C22 and the amplifier A22 must not be reduced erroneously due to a failure or the like.

In FIG. 10, a level detecting circuit 51 is provided to detect an incorrect positioning of the transducer relative to the rotating body. For instance, the level of the signal e1 output from the transducer that employs the coil TC shown in FIGS. 8 and 9 changes in correspondence to the distance L between the transducer and the rotating body Rot. Thus, in order to stabilize the signal e1 and make it constant, it is necessary to detect incorrect positioning including an instance of the transducer being too close to the rotating body.

Figure 14:
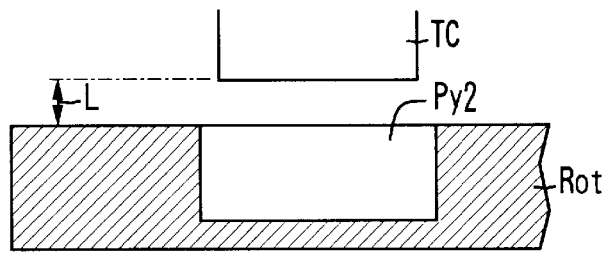
FIG. 14 illustrates the relationship between the electromagnetic induction coil and the rotating body, which constitute the detector.

FIG. 14 shows the positioning of the rotating body Rot and the coil TC. The rotating body Rot and the coil TC face opposite each other over the distance L. Holes Py2 are formed in the rotating body Rot. It is assumed that when the coil TC is at a position facing opposite a hole Py2, L=L1 and that when the coil TC is at a position facing opposite the disk surface other than at a hole Py2, L=L2. The coil TC, as shown in FIG. 9, constitutes a resonance circuit together with the capacitor Cr.

Figure 15:
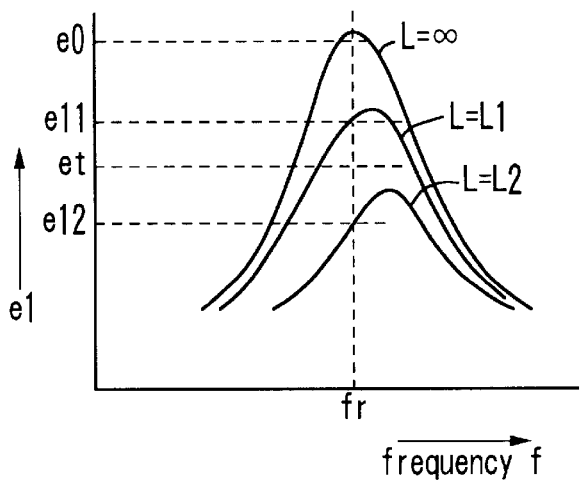
FIG. 15 is a graph illustrating the operation characteristics of the detector shown in FIG. 14.

FIG. 15 shows the change in the output level resulting from Q at the resonance circuit changing in correspondence to the distance L. When it is assumed that a signal with the frequency fr is provided to the coil TC, L2<L<L1 and, consequently, the level et of the output e1 is e12<et<e11. When L=∞, et=e0>e11 and when L=0, et<e12.

By making the settings in such a manner that the upper and lower limit threshold values of the level detecting circuit 51 include e1 to e2 and do not include levels at L=∞ and L=0, L=∞ and L=0 can be detected.

Figure 16:
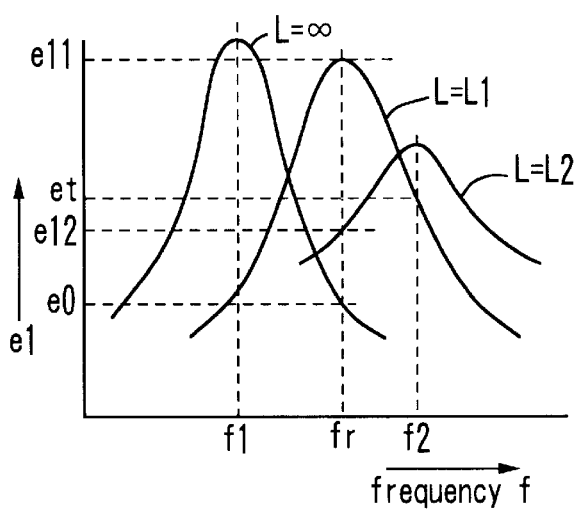
FIG. 16 is another graph illustrating the operation characteristics of the detector shown in FIG. 14.

FIG. 16 shows a case in which the resonance frequency of the coil TC changes in correspondence to the distance L. In this case, too, since, with a signal with the frequency fr provided to the coil TC, L2<L<L1, the level et of the output e1 is e12<et<e11. Since et=e0<e12 when L=∞, by setting the upper and lower limit threshold values of the level detecting circuit 51 in a similar manner, an error in the positioning of the coil TC can be detected.

The embodiment shown in FIG. 10 is further provided with a third AND circuit 52. The AND circuit 52 calculates the AND of an output signal A1$i$ provided by the level detecting circuit 51 and a signal A2$i$ provided by the rotation stoppage judgement circuit 4 and outputs a rotation stoppage output signal Z. As a result, it is possible to verify that the detector 1 is combined with the rotating body in a normal manner without having dropped off or being positioned in an erroneous manner. Also, it is possible to output the rotation stoppage judgement output signal Z based upon a verification that the rotating body Rot has been monitored until immediately before the notification of moving part stoppage is issued.

Figure 17:
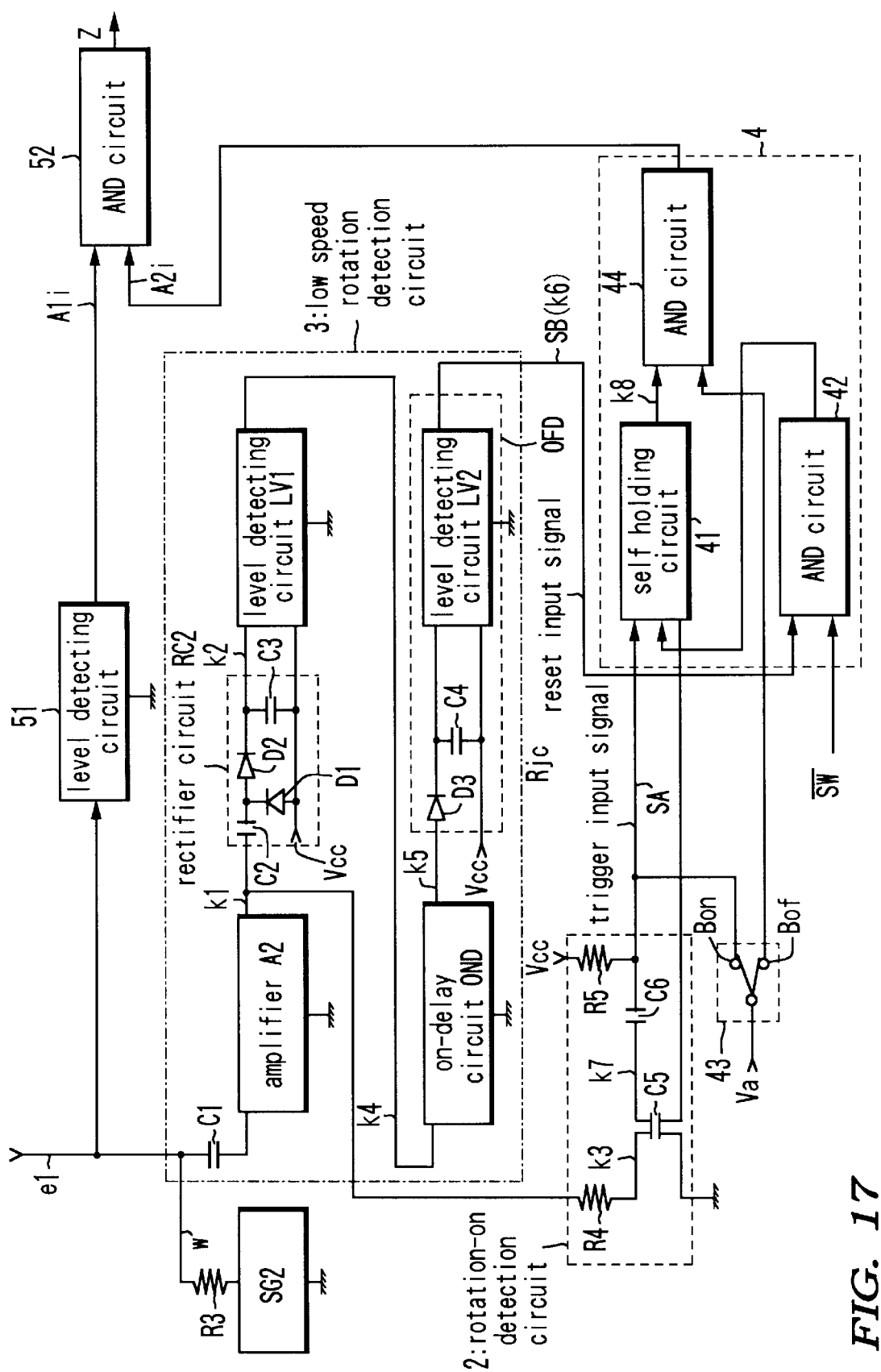
FIG. 17 is an electric circuit diagram of another specific embodiment of the transition detection circuit according to the present invention.

In the embodiment shown in FIG. 10, if the rotating body is not rotating when the power source is supplied to the circuit, for instance, the trigger signal is not input to the self holding circuit 41 and, therefore, the high level signal k8 is not generated. Consequently, it is desirable to provide a switch or the like in order to provide a trigger signal during an initial stage of the operation of the circuit. FIG. 17 shows an example of a structure in which a switch 43 for fulfilling this purpose is added to the circuit shown in FIG. 10.

A signal Va whose level is higher than that of the source voltage Vcc is provided to a common terminal of the switch 43. A terminal Bon is connected to the trigger input signal line in parallel. Since the reset signal k6 is at high when the rotation is stopped, if the common terminal of the switch 43 is connected to the terminal Bon, the high level trigger signal Va is input to the self holding circuit 41, resulting in the high level signal k8 being generated. The high level signal k8 is used as the rotation stoppage judgement output signal Z.

Next, after connecting the common terminal to the terminal Bon, if it is not reset, the high level trigger signal Va will be provided to the self holding circuit 41 constantly and, as a result, the signal k8 will be generated in synchronization with the signal k6 without depending upon the trigger input signal (rotation-on output signal) from the rotation-on detection circuit 2. In order to prevent this, the embodiment shown in FIG. 17 employs a structure in which the trigger signal Va is input to a second AND circuit 44 through an negative phase terminal Bof of the switch 43.

In order to operate the switch 43, the common terminal for providing the trigger signal Va is first connected to the terminal Bon to input the trigger signal Va to the self holding circuit 41. Then the common terminal is connected to the negative phase terminal Bof.

The AND circuit 44, which has a lower limit threshold value, verifies that the trigger signal Va is provided by the self holding circuit 41 and the negative phase terminal Bof. The AND circuit 44 generates a high level output signal A2$i$ only when the signal k8 is at high, the internal terminal of the switch 43 is connected to the terminal Bof and the high level trigger signal Va is provided to the AND circuit 44. This prevents a failure to reset the terminal of the switch 43.

Figure 18:
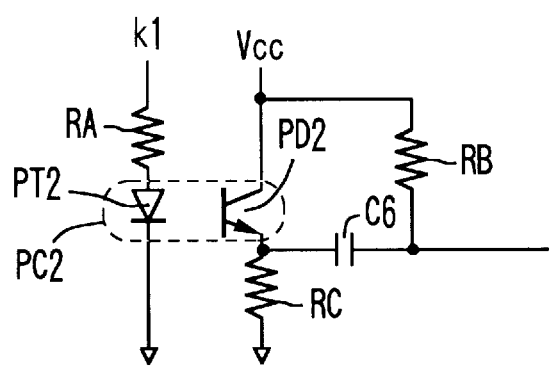
FIG. 18 is an electric circuit diagram of a specific example of a rotation-on detection circuit constituting the transition detection circuit according to the present invention.

The rotation-on detection circuit 2 shown in FIGS. 10 and 17 may be substituted by the circuit shown in FIG. 18. In FIG. 18, a resistor RA is a current limiting resistor and the signal k1 is provided to a light emitting element PT2 of a photocoupler PC2 via the resistor RA. If the level of the signal k1 drops without an electric current running through the light emitting element PT2 of the photocoupler PC2, the impedance of a light receiving element PD2 of the photocoupler PC2 increases. The light receiving element PD2 is constituted of a light receiving transistor with its emitter potential at approximately the GND level and the capacitor C6 is charged via resistors RB and RC.

Next, when the level of the signal k1 rises and an electric current runs through the light emitting element PT2, the impedance of the light receiving element PD2 of the photocoupler PC2 becomes lower than that of the resistor RC. The emitter potential of the light receiving element PD2 increases to reach a level which is approximately at the level of the source potential Vcc, and the rise of the emitter potential is differentiated and level shifted at the capacitor C6 to generate a high level trigger input signal SA.

In addition, when the signal K1 is an amplified high frequency signal w, the photocoupler PC2 cannot follow. The light receiving element PD2 of the photocoupler PC2 cannot be switched and continuously holds a low impedance. Because of this, the high frequency signal w is never output as a trigger signal.

The resistor R5 shown in FIGS. 10 and 17 and the resistor RB shown in FIG. 9 may be replaced by diodes. In that case, the anode terminal of a replacement diode is connected to the source Vcc and its cathode terminal is connected to the capacitor C6. When a signal k7 has fallen, the capacitor C6 is charged via the diode from the source voltage Vcc and when the signal has risen, its rise is differentiated and also its level is shifted to generate a trigger input signal. At this time, the diode is in an off-state.

In the circuits shown in FIGS. 10 and 17, the length of off-delay setting is determined by the length of the dissipation time that elapses after the output signal k5 is set to high until it is set to high again, as mentioned earlier. If the off-delay time is long, since the signal k6 is set to low with a delay even with the signal k5 set to low when the moving part enters a high speed rotation state again after a rotation stoppage, a notification of high speed rotation may be issued with a delay. After rotation starts, the operation waits for an input of the signal $\overline{SW}$ with a logical value of 0 and when it is input, the output from the AND circuit 42 is set to low, resulting in the signal k8 also being set to low. Therefore, this delay may not present a significant problem in practice. However, if there is a delay in the trigger signal $\overline{SW}$ with a logical value of 0, the notification of high speed rotation is performed with the signal k6, and in view of this fact, it goes without saying that it is desirable to minimize the delay in shifting to low.

Figure 19:
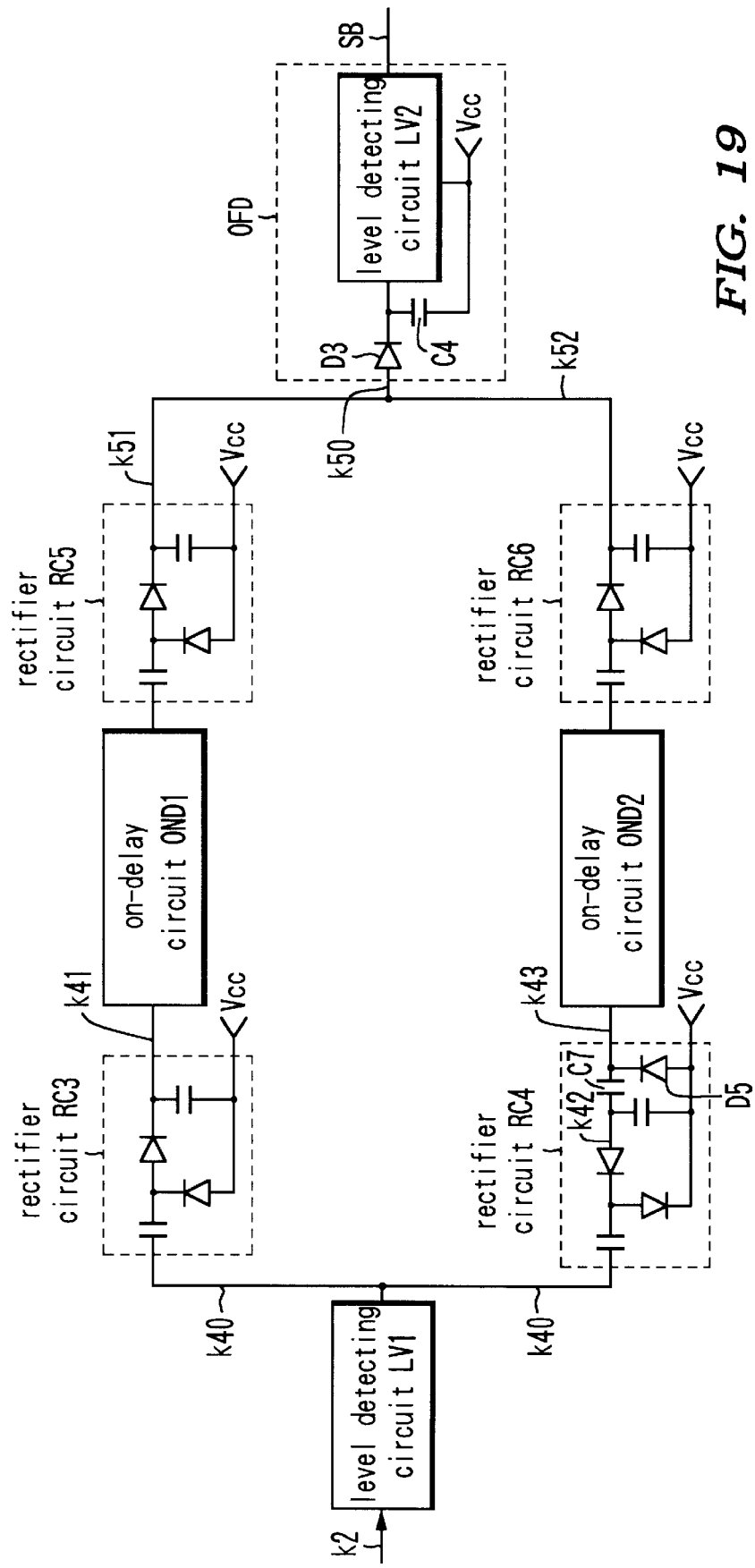
FIG. 19 is an electric circuit diagram of another example of the rotation-off detection circuit constituting the transition detection circuits shown in FIGS. 10 and 17.

FIG. 19 shows an example of a circuit which is suited for solving the problem of the delay described above. The level detecting circuit LV1 outputs a high frequency oscillating signal as a signal k40 when the signal k2 rises to or above the lower limit threshold value of the level detecting circuit LV1, and outputs a DC signal when the signal k2 falls to or below the lower limit threshold value.

Figure 20:
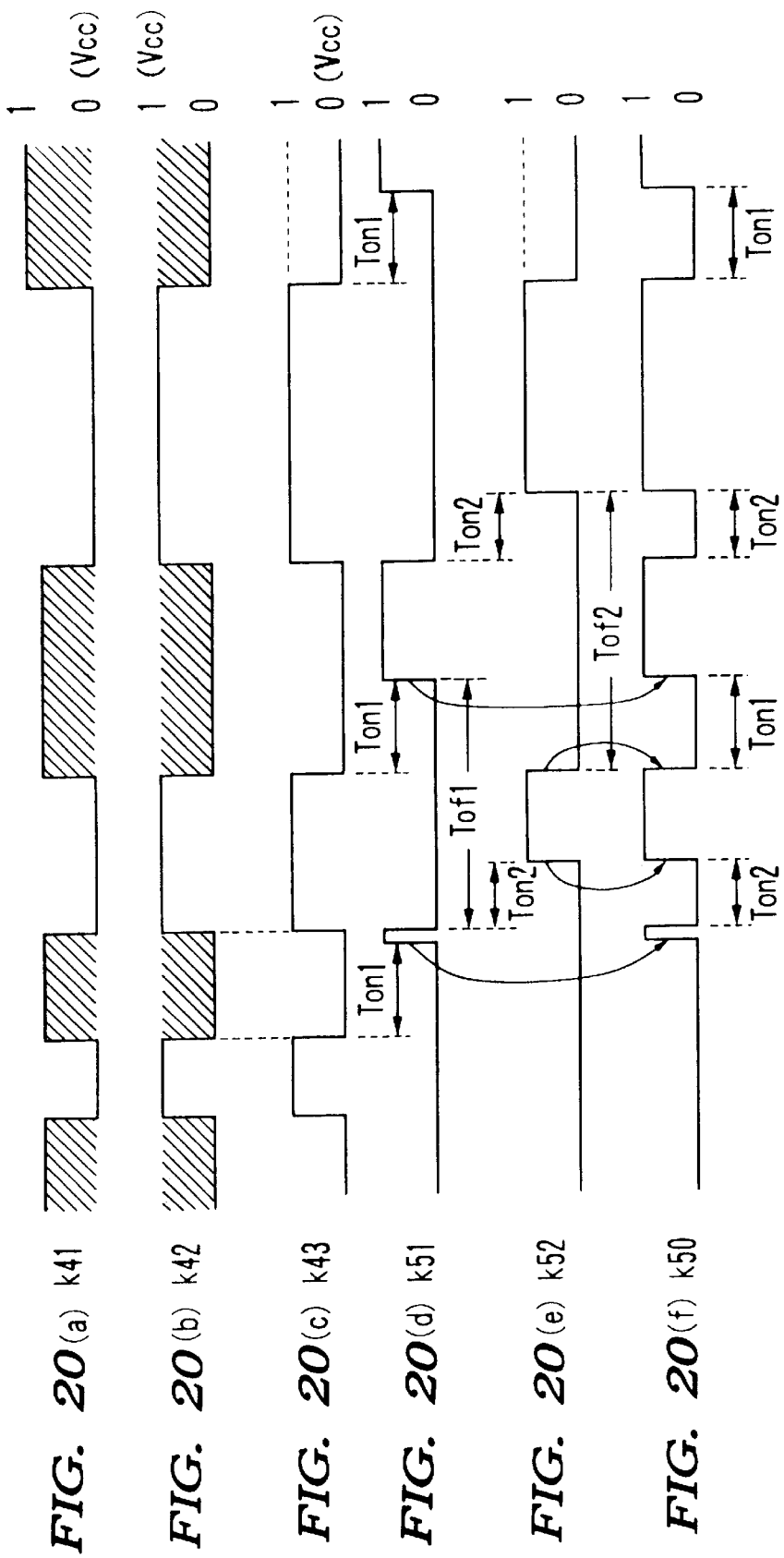
FIG. 20 is a time chart illustrating the operation of the circuit shown in FIG. 19.

A rectifier circuit RC3 generates a rectified signal whose level is higher than that of the source potential Vcc as a signal k41 when the signal k40 is a high frequency signal, and generates an approximate source potential Vcc when the signal k40 is a DC signal (see FIG. 20 ($a$)). In other words, the signal k41 is almost identical to the signal k2.

Now, a rectifier circuit RC4 generates a rectified signal whose level is lower than that of the source potential Vcc as a signal k42 when the signal k40 is a high frequency signal and outputs an approximate source potential Vcc as a signal k42 when the signal k40 is a DC signal (see FIG. 20 ($b$)). The level of the signal k42 is shifted at a capacitor C7 and a diode D5 to become a signal k43 (see FIG. 20 ($c$)).

Thus, the signal k41 and the signal k43 become signals whose phases are opposite each other. The signals k41 and k43 are input to the on-delay circuits OND1 and OND2 respectively. The on-delay circuits OND1 and OND2 have delays Ton1 and Ton2 respectively.

The on-delay circuit OND1 detects that the rotation rate of the moving part indicated by the signal e1 has fallen to or below a specific rotation rate based upon the high level sustaining time of the signal k41. The high level sustaining time of the signal k41 corresponds to the high level sustaining time of the signal k2. The on-delay circuit OND2 detects that the rotation rate of the moving part indicated by the signal e1 has fallen to or below the specific rotation rate based upon the high level sustaining time of the signal k43. The high level sustaining time of the signal k43 corresponds to the low level sustaining time of the signal k2. The delays Ton1 and Ton2 of the on-delay circuits OND1 and OND2 respectively are set so that the rates to be detected are approximately the same.

The outputs from the on-delay circuits OND1 and OND2 are provided to the rectifier circuits RC5 and RC6 respectively. The output sides of the rectifier circuits RC5 and RC6 are connected in wired OR connection.

When the rotation rate of the moving part has fallen to or below a specific value, a high level signal k51 emerges on the output side of the rectifier circuit RC5 when the delay Ton1 has elapsed after the signal k2 is set to high due to the on delay function of the on-delay circuit OND 1 (see FIG. 17 (d)). In a similar manner, a high level signal k52 emerges from the output side of the rectifier circuit RC6 when the delay Ton2 has elapsed after the signal k2 is set to low due to the on-delay function of the on-delay circuit OND2 (see FIG. 20 (e)). As shown in FIG. 20 (f) a signal k50 which constitutes a wired OR of the signals k51 and k52 becomes a signal which has low level blocks, i.e., the dissipation times Ton1 and Ton2 between high level periods. The dissipation times Ton1 and Ton2 are sufficiently short in comparison to the dissipation time Tof1 shown in FIG. 11. Thus, a delay in issuing a notification when the moving part enters a high speed rotation state again after stopping rotation can be reduced.

Figure 21:
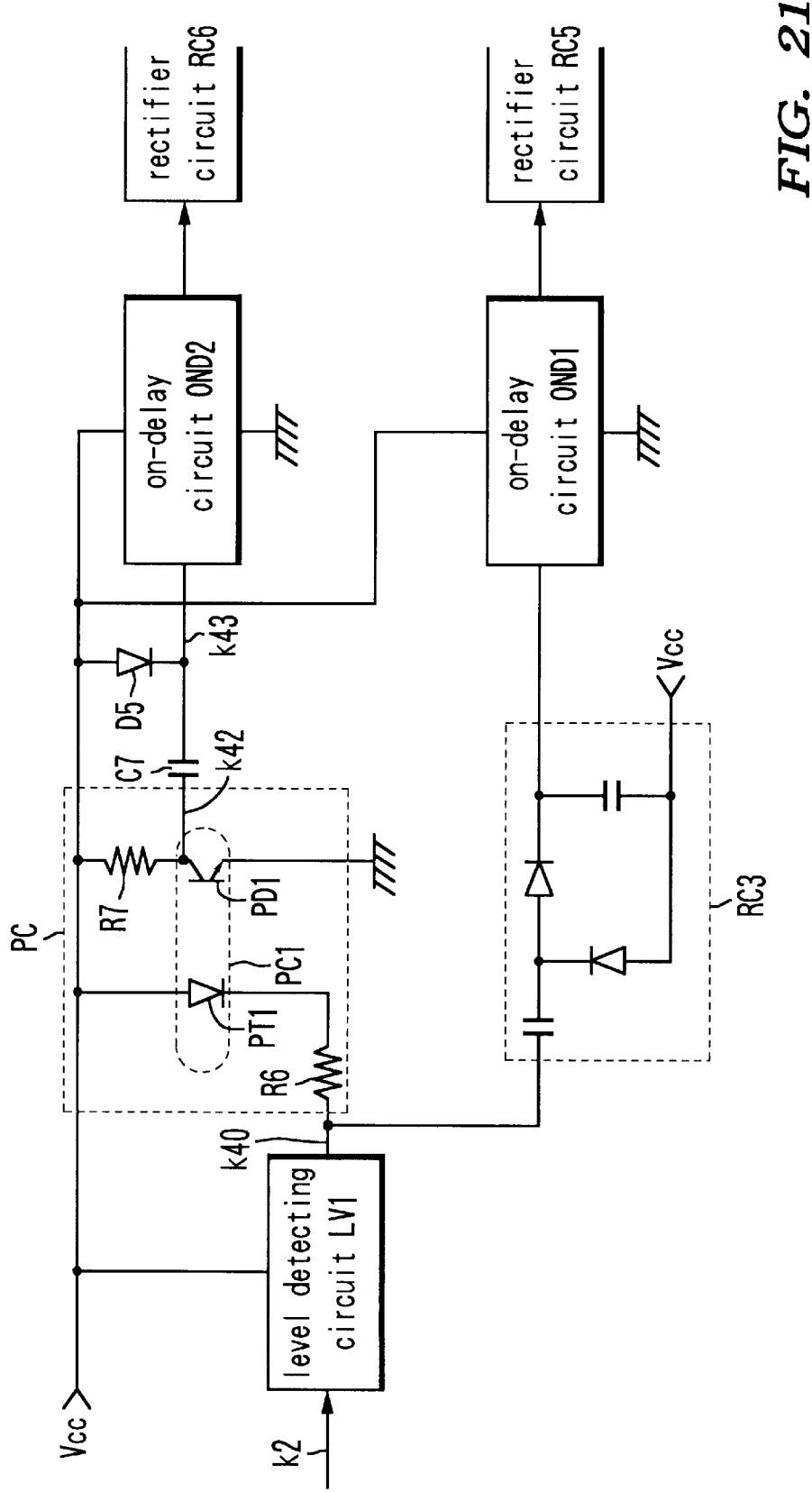
FIG. 21 is an electric circuit diagram of a variation of the circuit shown in FIG. 19.

FIG. 21 shows an example of the structure in which the rectifier circuit RC4 shown in FIG. 19 is constituted of a photocoupler PC. In FIG. 21, even when the signal k2 is at high, if the signal k40 is a high frequency oscillating signal, the photocoupler PC cannot follow and the impedance of the light receiving element PD1 is lower than that of a resistor R7. The collector potential signal k42 of the light receiving element PD1 is set at approximately the GND level and the signal k43 is set at approximately the source potential Vcc. At this time, the capacitor C7 is charged to the level of the source voltage Vcc via the diode D5 and the light receiving element PD1.

If the signal k40 takes on a DC potential (approximately the source potential Vcc), no electric current runs through a light emitting element PT1 and, consequently, the impedance of the light receiving element PD1 becomes higher by the resistor R7. The signal k42, which is provided as the collector potential of the light receiving element PD1, is set at approximately the source potential Vcc. The level of the rise signal of this signal k42 is shifted at the capacitor C7 and with this, the signal k43, whose level is higher than that of the source potential, is generated. It is assumed that the capacitor C7 has a capacitance large enough to ensure that the level shift is performed while the waveform of the signal k42 is maintained almost intact to generate the signal k43.

When the signal k2 is at high and the signal k40 is a high frequency oscillating signal as described above, the signal k43 is approximately at the source potential Vcc, and when the signal k2 is a DC potential, the signal k43 is a signal whose level is higher than that of the source potential. This factor is similar to that in the case of the rectifier circuit RC 4.

To clarify the relationship between the present application and International Patent Application PCT/JP95/00675, the main part of the structures illustrated in FIGS. 6 to 11, FIG. 17 and FIGS. 19 to 21 in this application were already disclosed in International Patent Application PCT/JP95/00675. FIGS. 1 to 5 which illustrate the basic concept of the present application were induced from the illustrations included in International Patent Application PCT/JP95/00675 and also from the corresponding text in the specification.

When constituting the level detecting circuits and the AND circuits in the present invention as fail safe elements, one of the fail safe window comparators /AND gates disclosed in U.S. Pat. No. 5,345,138, U.S. Pat. No. 4,661,880 and U.S. Pat. No. 5,027,114 may be used. In addition, for the on-delay circuits, those in the prior art disclosed in International Publication WO94/23303, Japanese Examined Patent Publication No. 23006/1989, Japanese Examined Patent Publication No. 316934/1995 and the like may be used. Moreover, for the self holding circuit, one of those disclosed in International Publication WO94/23303, International Publication WO94/23496 and the like in the prior art may be employed.

As has been explained, according to the present invention, a transition detection circuit that detects completion of a transition in the state of an object of detection in a fail safe manner while taking into consideration the possibility of an error in the detector and in the circuits, can be provided.

We claim:

1. A transition detection circuit comprising:
    a detector outputting a signal corresponding to operation characteristics of an object of detection, said operation characteristics including a shift from a first state to a second state;
    a first state detection circuit generating a first output signal at different levels which include a high level and a low level corresponding to said first state based upon a signal provided by said detector;
    a second state detection circuit generating a second output signal at different levels which include a high level and a low level corresponding to said second state based upon said signal provided by said detector, said first output signal and said second output signal having a period of time during which said first output signal is at the high level and said second output signal is at the high level while said object of detection shifts from said first state to said second state in a normal manner; and
    a state judgement circuit generating a state judgement output signal on condition that said first output signal and said second output signal have had a period of time during which said first output signal is at the high level and said second output signal is at the high level.

2. A transition detection circuit according to claim 1, wherein:
    said second state detection circuit generates said second output signal with a delay when said signal provided by said detector indicates a state which constitutes a target of detection thereof relative to a time point of detection of said signal and said second state detection circuit immediately stops generating said second output signal when said signal provided by said detector does not indicate said state which constitutes a target of detection thereof.

3. A transition detection circuit according to claim 1, wherein:
    said state judgement circuit generates said state judgement output signal with a delay relative to a time point of input of said second output signal.

4. A transition detection circuit according to claim 1 further comprising:
    a signal generator which superimposes a high frequency signal on said signal provided by said detector.

5. A transition detection circuit according to claim 4, wherein:
    said signal generator superimposes said high frequency signal on said signal provided by said detector on a signal line through which said signal provided by said detector is induced to said second state detection circuit.

6. A transition detection circuit according to claim 4, wherein:

said signal generator superimposes said high frequency signal on said signal provided by said detector on a signal line through which said signal provided by said detector is induced to said first state detection circuit and said second state detection circuit.

7. A transition detection circuit according to claim 1, wherein:

said state judgement output signal can be at different levels which include a high level and a low level; and at said state judgement circuit, after said state judgement output signal is generated, said state judgement output signal is held at the high level if a signal input from said second state detection circuit is at the high level and said state judgement circuit output signal is set to the low level when said signal input from said second state detection circuit is set to the low level.

8. A transition detection circuit according to claim 1, wherein:

said state judgement output signal at said state judgement circuit is additionally determined by an outside signal which is not output by the detector.

9. A transition detection circuit according to claim 1, wherein:

said object of detection is a rotating body.

10. A transition detection circuit according to claim 9, wherein:

said detector outputs a signal with a frequency corresponding to a rotation rate of said object of detection;

said first state detection circuit is a rotation-on detection circuit that generates a high level first output signal when said frequency of said signal is at or above a specific value;

said second state detection circuit is a low speed rotation detection circuit that generates a high level second output signal when said frequency of said signal is at or below a specific value; and said state judgement circuit is a rotation stoppage judgement circuit which generates a rotation stoppage judgement output signal as said state judgement output signal.

11. A transition detection circuit according to claim 10, wherein:

said low speed rotation detection circuit generates said second output signal with a delay when said signal provided by said detector indicates a state which constitutes a target of detection thereof relative to a time point of input of said signal and said low speed rotation detection circuit immediately stops generating said second output signal when said signal provided by said detector no longer indicates said state which constitutes a target of detection thereof.

12. A transition detection circuit according to claim 10, wherein:

said rotation stoppage judgement circuit generates said rotation stoppage judgement output signal with a delay relative to a time point of input of said second output signal.

13. A transition detection circuit according to claim 10 further comprising:

a signal generator which superimposes a high frequency signal on said signal provided by said detector.

14. A transition detection circuit according to claim 13, wherein:

said signal generator superimposes said high frequency signal on said signal provided by said detector on a signal line through which said signal provided by said detector is induced to said low speed rotation detection circuit.

15. A transition detection circuit according to claim 13, wherein:

said signal generator superimposes said high frequency signal on said signal provided by said detector on a signal line through which said signal provided by said detector is induced to said rotation-on detection circuit and said low speed rotation detection circuit.

16. A transition detection circuit according to claim 15, wherein:

said rotation-on detection circuit is provided with a low pass filter that attenuates the high frequency component of the input signal.

17. A transition detection circuit according to claim 10, wherein:

said rotating stoppage judgement output signal can be at different levels which include a high level and a low level; and at said rotation stoppage judgement circuit, after said rotation stoppage judgement output signal is generated, said rotation stoppage judgement output signal is held at the high level if a signal input from said low speed rotation detection circuit is at the high level and said rotation stoppage judgement output signal is set to the low level when said signal input from said low speed rotation detection circuit is set to the low level.

18. A transition detection circuit according to claim 17, wherein:

said rotation stoppage judgement output signal of said rotation stoppage judgement circuit is additionally upon an outside signal which is not output by the detector.

19. A transition detection circuit according to claim 18, wherein:

said rotation stoppage judgement circuit includes a self holding circuit and a first AND circuit;

said first AND circuit outputs a high level signal only when an output signal from said low speed rotation detection circuit is at the high level and said outside signal is at the high level; and said self holding circuit generates a high level signal when a trigger input signal is input from said rotation-on detection circuit in a state in which said high level signal provided by said first AND circuit is input as a reset input signal.

20. A transition detection circuit according to claim 19, wherein:

a means for providing said trigger input signal to said self holding circuit at power up is provided.

21. A transition detection circuit according to claim 20, wherein:

said means is constituted with a switch, with said switch having a terminal through which said trigger input signal is provided to said self holding circuit at power up.

22. A transition detection circuit according to claim 21, wherein:

said switch is provided with a negative phase terminal which has an negative phase relative to said terminal; and a second AND circuit that outputs a high level signal when an on signal of said anti-phase terminal and a high level signal from said self holding circuit are input.

23. A transition detection circuit according to claim 10, wherein:

a means for detecting erroneous positioning of said detector is provided.

24. A transition detection circuit according to claim 23, wherein:

said means for detecting erroneous positioning of said detector includes a level detecting circuit that uses said signal provided by said detector as an input signal and detects a level thereof.

25. A transition detection circuit according to claim 24, wherein:

said means for detecting erroneous positioning of said detector includes a third AND circuit and said third AND circuit outputs a high level signal when a signal provided by said level detecting circuit is at the high level and a signal provided by said rotation stoppage judgement circuit is at the high level.

\* \* \* \* \*